(12) United States Patent
Shinohara

(10) Patent No.: US 8,760,775 B2
(45) Date of Patent: Jun. 24, 2014

(54) IMAGING LENS AND IMAGING APPARATUS INCLUDING THE IMAGING LENS

(71) Applicant: Fujifilm Corporation, Tokyo (JP)

(72) Inventor: Yoshikazu Shinohara, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/103,115

(22) Filed: Dec. 11, 2013

(65) Prior Publication Data

US 2014/0098428 A1    Apr. 10, 2014

Related U.S. Application Data

(63) Continuation of application No. PCT/JP2012/003821, filed on Jun. 12, 2012.

(30) Foreign Application Priority Data

Jun. 15, 2011  (JP) .................... 2011-133062
Jun. 11, 2012  (JP) .................... 2012-131657

(51) Int. Cl.
*G02B 13/00* (2006.01)
*G02B 13/08* (2006.01)
*G02B 9/60* (2006.01)

(52) U.S. Cl.
CPC .......... *G02B 13/0045* (2013.01); *G02B 9/60* (2013.01)
USPC ........................... 359/714; 359/766

(58) Field of Classification Search
CPC ............. G02B 13/001; G02B 13/002; G02B 13/0045; G02B 9/60
USPC ................. 359/714, 763, 764, 766
See application file for complete search history.

(56) References Cited

U.S. PATENT DOCUMENTS

| | | | |
|---|---|---|---|
| 3,966,307 A | 6/1976 | Tojyo | |
| 5,657,170 A | 8/1997 | Yahagi et al. | |
| 7,274,515 B2 | 9/2007 | Noda | |
| 7,911,911 B2 | 3/2011 | Doi | |
| 8,390,941 B2* | 3/2013 | Shinohara | 359/714 |
| 8,542,448 B2* | 9/2013 | Shinohara | 359/714 |
| 2010/0315723 A1 | 12/2010 | Noda | |
| 2014/0049839 A1* | 2/2014 | Shinohara | 359/714 |
| 2014/0071543 A1* | 3/2014 | Shinohara | 359/713 |
| 2014/0078600 A1* | 3/2014 | Shinohara | 359/714 |

FOREIGN PATENT DOCUMENTS

| | | |
|---|---|---|
| JP | 50-068523 | 6/1975 |
| JP | 5-303033 | 11/1993 |
| JP | 2009-294527 | 12/2009 |

OTHER PUBLICATIONS

International Search Report, PCT/JP2012/003821, Aug. 21, 2012.

* cited by examiner

*Primary Examiner* — David N Spector
(74) *Attorney, Agent, or Firm* — Young & Thompson

(57) ABSTRACT

An imaging lens substantially consists of five lenses of an aspheric first lens having a convex surface facing an object side and positive refractive power, an aspheric second lens having a concave surface facing the object side and negative refractive power, an aspheric third lens having a meniscus shape in which its object-side surface is convex toward the object side, and positive refractive power, an aspheric fourth lens having negative refractive power and a fifth lens having a convex surface facing the object side and positive refractive power, which are in this order from the object side. Further, the imaging lens satisfies predetermined conditional formulas.

20 Claims, 19 Drawing Sheets

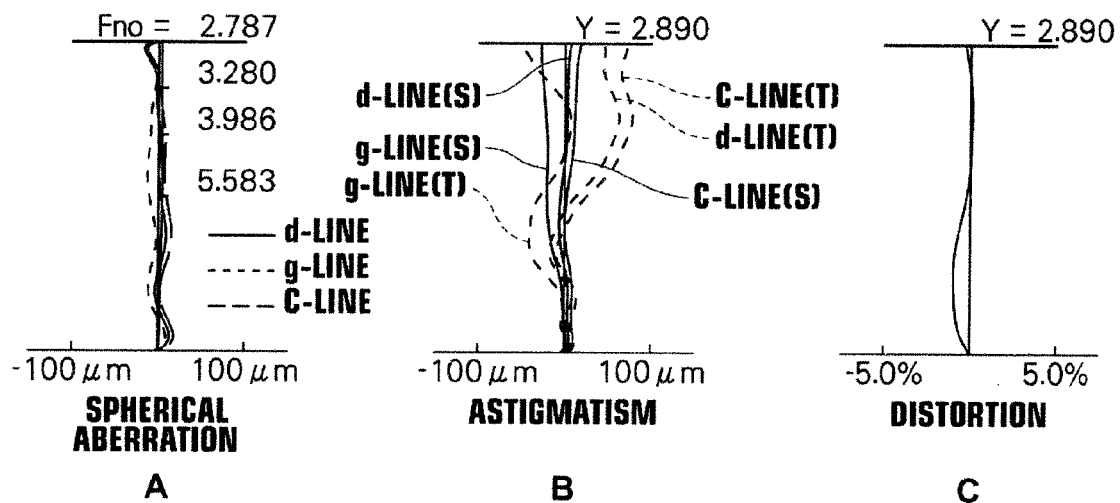
FIG.13   EXAMPLE 1
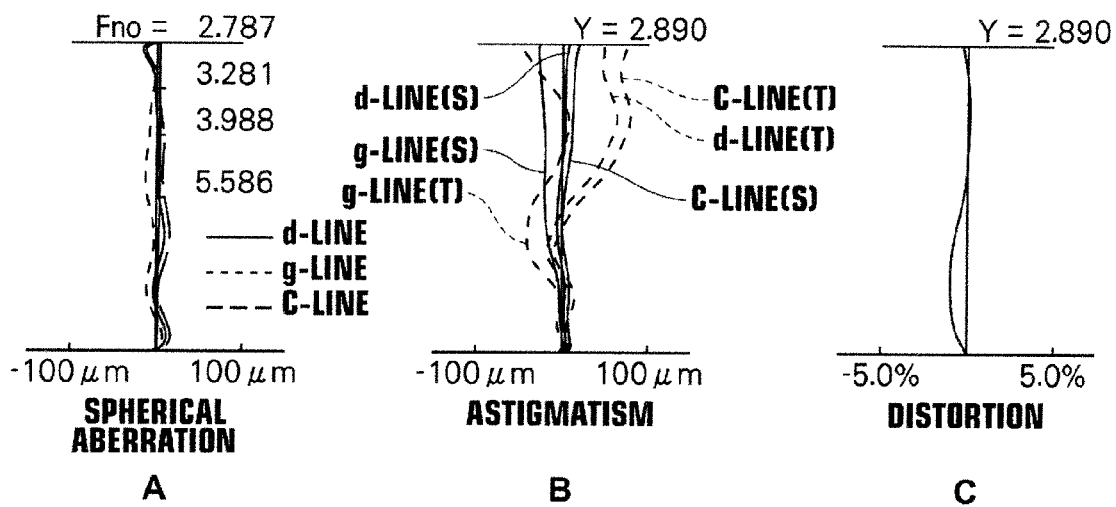
FIG.14   EXAMPLE 2

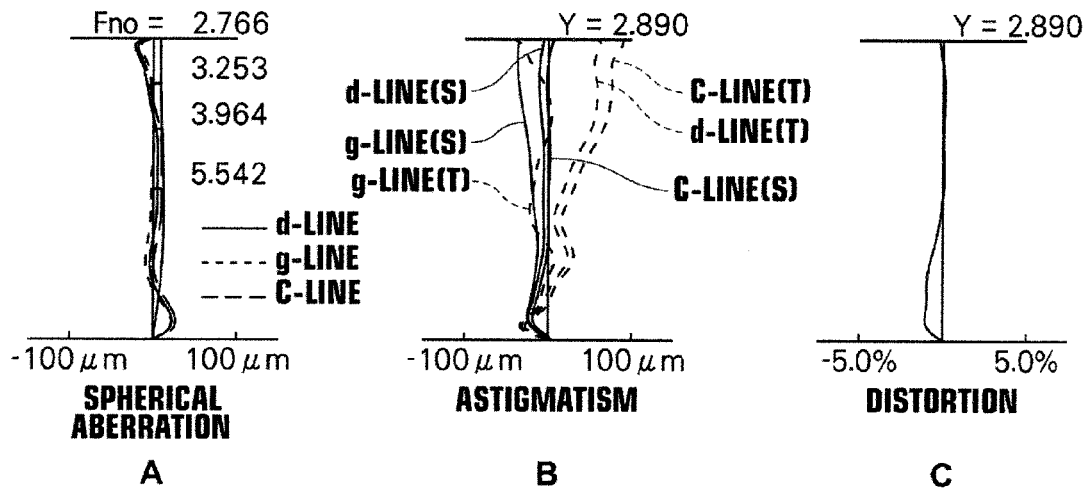
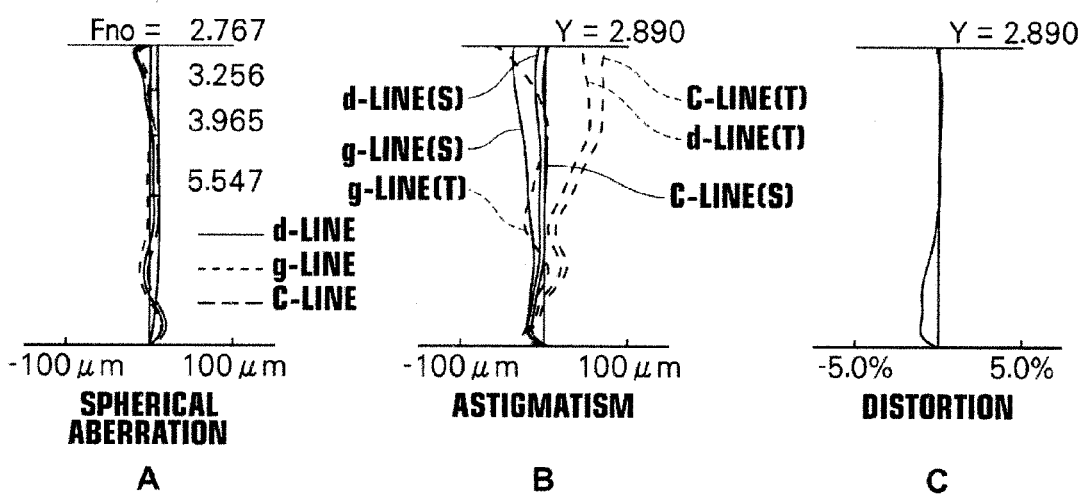

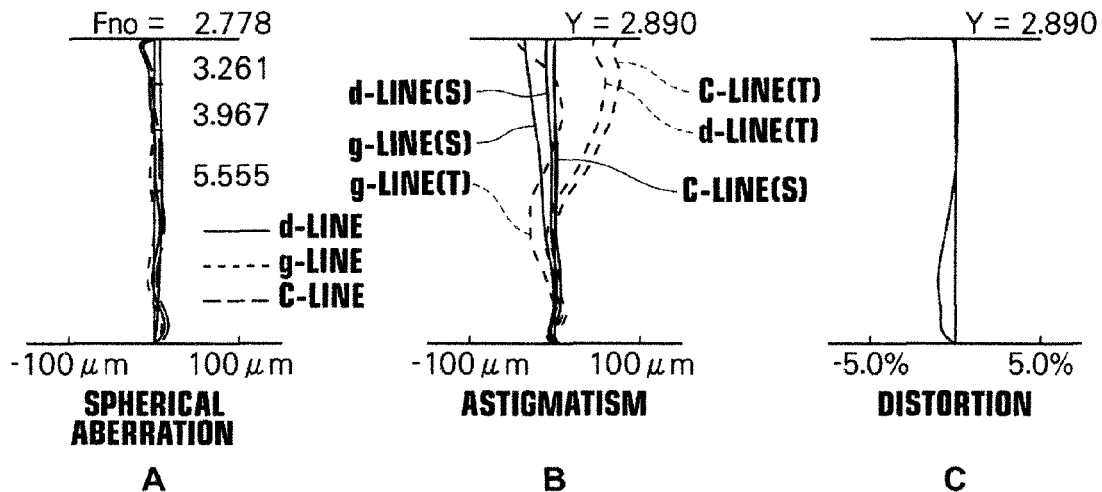
FIG.17 EXAMPLE 5
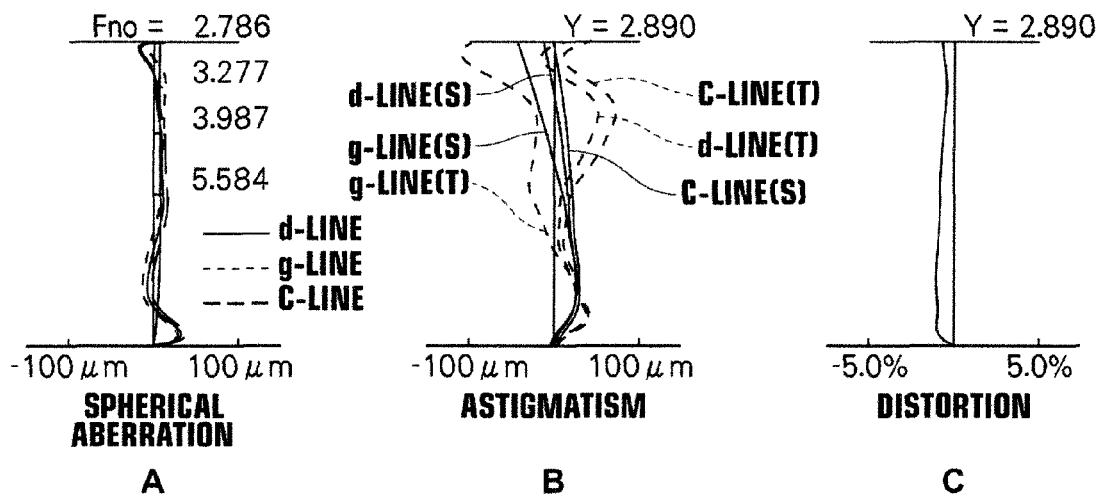
FIG.18 EXAMPLE 6

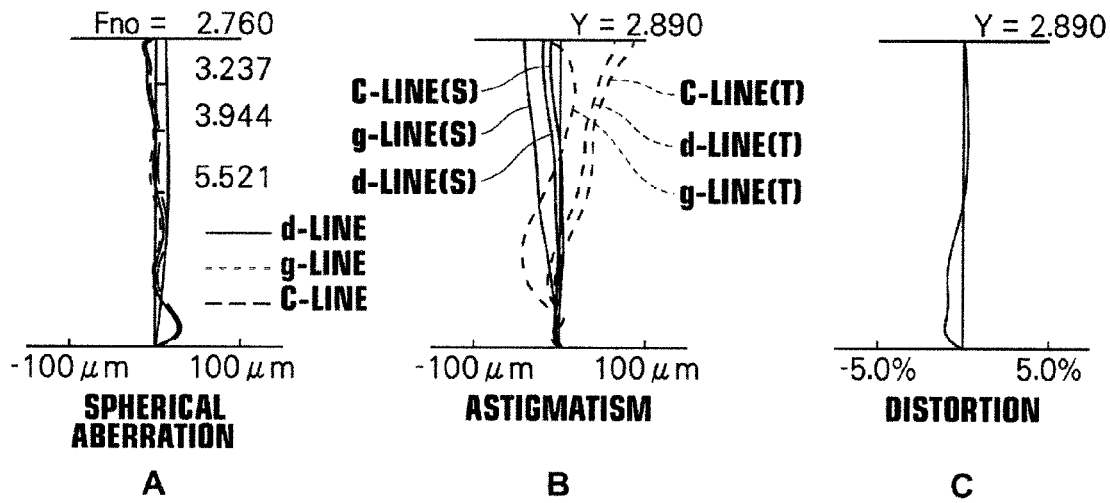
FIG.19  EXAMPLE 7
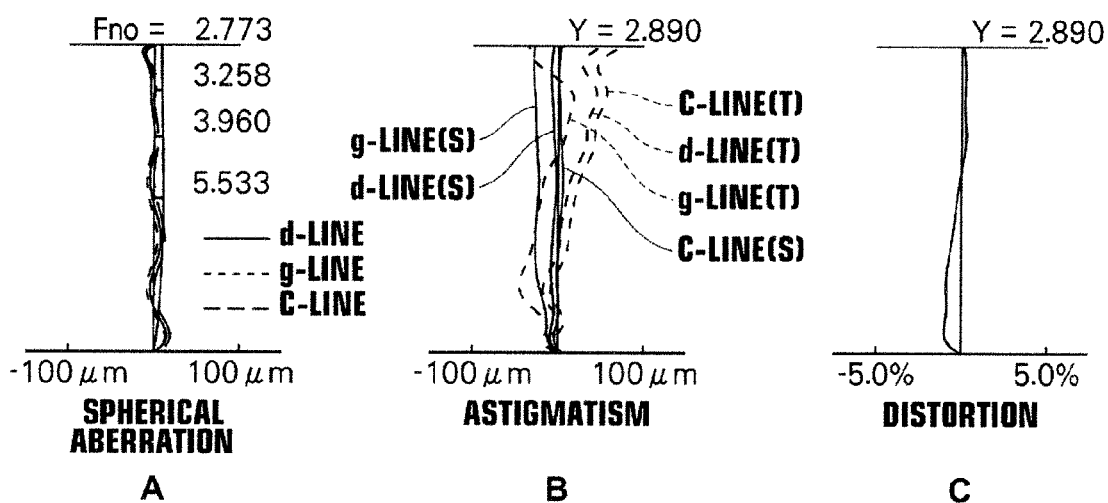
FIG.20  EXAMPLE 8

FIG.21  EXAMPLE 9
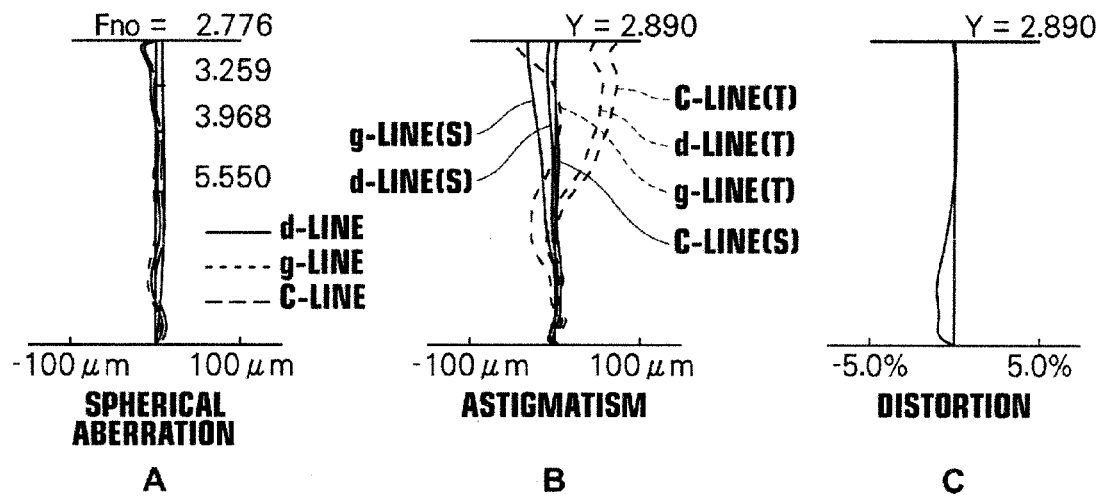
FIG.22  EXAMPLE 10
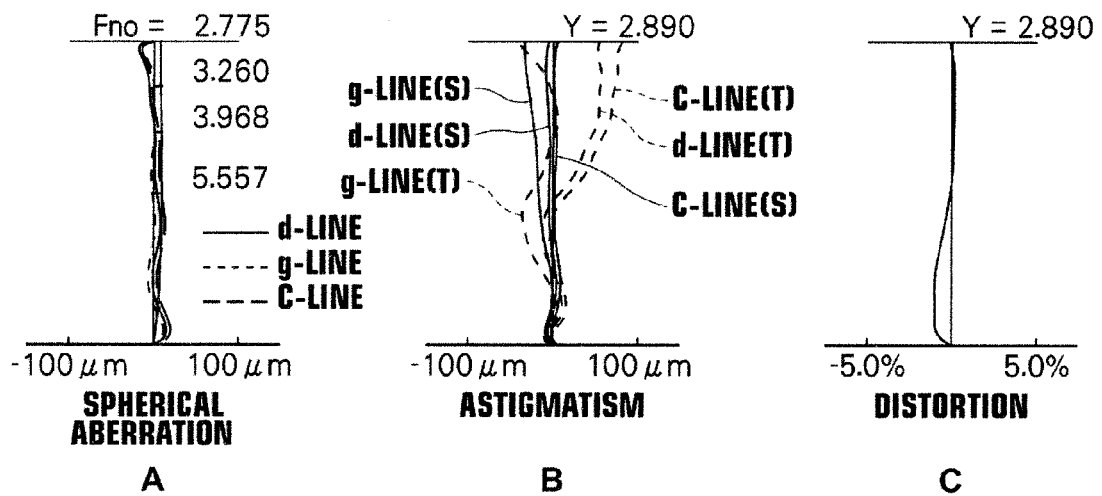

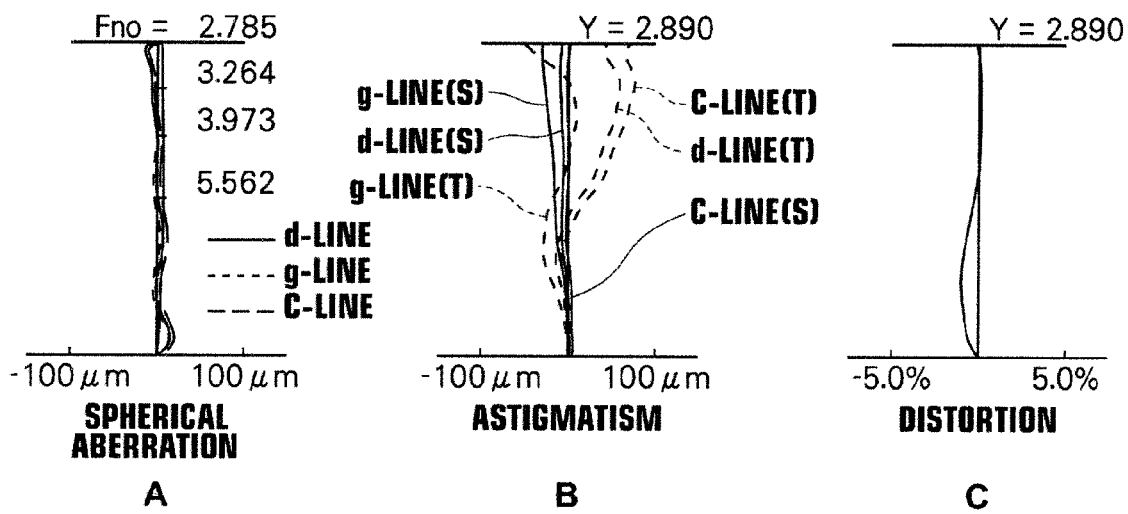
FIG.23 EXAMPLE 11
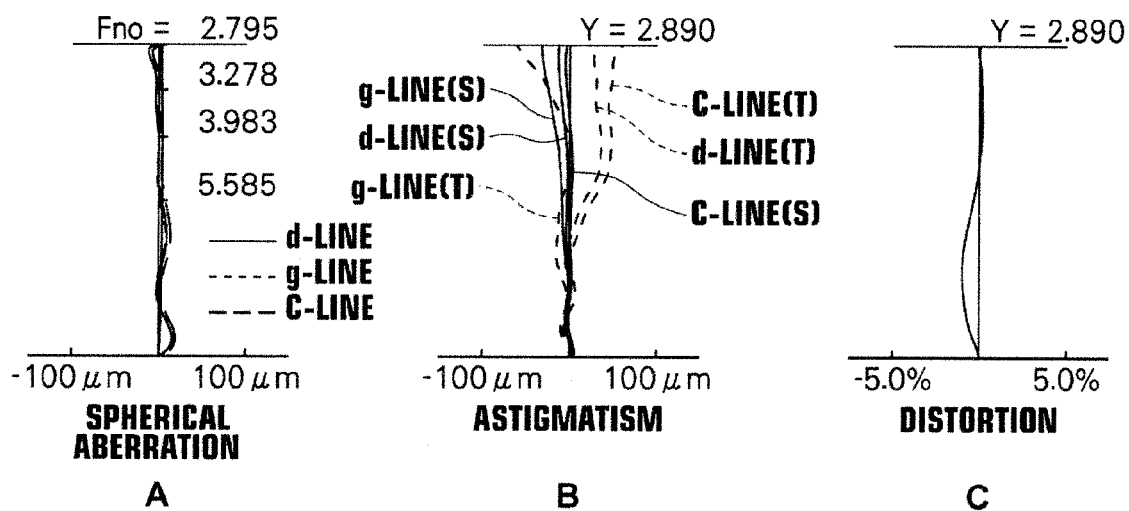
FIG.24 EXAMPLE 12

US 8,760,775 B2

IMAGING LENS AND IMAGING APPARATUS INCLUDING THE IMAGING LENS

CROSS REFERENCE TO RELATED APPLICATIONS

This application is a continuation of PCT/JP2012/003821 filed on Jun. 12, 2012, which claims foreign priority to Japanese application Nos. 2011-133062 and 2012-131657 filed on Jun. 15, 2011 and Jun. 11, 2012 respectively. The entire contents of each of the above applications are hereby incorporated by reference.

BACKGROUND OF THE INVENTION

1. Field of the Invention

This invention relates to an imaging lens that forms an optical image of a subject on an imaging device, such as a CCD (Charge Coupled Device) and a CMOS (Complementary Metal Oxide Semiconductor), and to an imaging apparatus, such as a digital still camera, a cellular phone with a camera, a smartphone, a tablet terminal, and an information mobile terminal (PDA: Personal Digital Assistance), on which the imaging lens is mounted to perform photography.

2. Description of the Related Art

As personal computers became owned by many families and the like in recent years, digital still cameras, which can input image data of a landscape, a portrait and the like obtained by photography into the personal computers, have rapidly spread. Further, camera modules for inputting images became often mounted on cellular phones. Such equipment having an imaging function uses an imaging device, such as a CCD and a CMOS. As the size of the imaging device became small in recent years, the total size of imaging equipment and the size of an imaging lens to be mounted on the imaging equipment also need to be reduced. Further, since the resolution of the imaging device has become higher at the same time, the imaging lens needs to have high resolution and high performance. For example, the imaging lens needs to have performance corresponding to high resolution of 2 megapixels or higher, and desirably performance corresponding to 5 megapixels or higher.

To satisfy such need, for example, a five lens structure, which consists of a relatively large number of lenses, may be adopted to reduce the total length and to increase resolution (please refer to Japanese Unexamined Patent Publication No. 2009-294527 (Patent Document 1), Specification of U.S. Pat. No. 7,274,515 (Patent Document 2), Specification of U.S. Pat. No. 7,911,911 (Patent Document 3), Specification of U.S. Patent Application Publication No. 20100315723 (Patent Document 4), and U.S. Pat. No. 5,657,170 (Patent Document 5)).

SUMMARY OF THE INVENTION

However, the lenses disclosed in Patent Documents 1 through 4, each consisting of five lenses, further need to reduce the total length and to increase resolution. The lens disclosed in Patent Document 5, which consists of five lenses, further needs to more excellently correct a longitudinal chromatic aberration.

In view of the foregoing circumstances, it is an object of the present invention to provide an imaging lens that can achieve high image formation performance from a center of an angle of view through a peripheral portion of the angle of view, in which especially a longitudinal chromatic aberration and a chromatic aberration in a peripheral portion of an image formation area are excellently corrected while the total length of the imaging lens is reduced. Further, it is another object of the present invention to provide an imaging apparatus on which the imaging lens is mounted, and which can obtain a high resolution imaging image.

An imaging lens of the present invention is an imaging lens substantially consisting of five lenses of:

a first lens having a convex surface facing an object side in the vicinity of an optical axis and positive refractive power in the vicinity of the optical axis, and at least one of the surfaces of which is aspherical;

a second lens having a concave surface facing the object side in the vicinity of the optical axis and negative refractive power in the vicinity of the optical axis, and at least one of the surfaces of which is aspherical;

a third lens having a meniscus shape with its convex surface facing the object side in the vicinity of the optical axis and positive refractive power in the vicinity of the optical axis, and at least one of the surfaces of which is aspherical;

a fourth lens having negative refractive power in the vicinity of the optical axis, and at least one of the surfaces of which is aspherical; and a fifth lens having a convex surface facing the object side in the vicinity of the optical axis and positive refractive power in the vicinity of the optical axis, and at least one of the surfaces of which is aspherical, which are in this order from the object side, wherein the following conditional formulas are satisfied:

$$1 < f2/f4 < 3 \qquad (2); \text{ and}$$

$$Nd3 < 1.6 \text{ and } Nd5 < 1.6 \qquad (3), \text{ where}$$

f2: a focal length of the second lens,
f4: a focal length of the fourth lens,
Nd3: a refractive index of the third lens, and
Nd5: a refractive index of the fifth lens.

Here, the expression "substantially consisting of five lenses" means that the imaging lens of the present invention may include a lens substantially without power, an optical element, such as a stop and a cover glass, which is not a lens, a mechanism part, such as a lens flange, a lens barrel, an imaging device and a hand shake blur correction mechanism, and the like besides the five lenses.

According to the imaging lens of the present invention, the structure of each lens element is optimized in a lens structure of five lenses in total. Therefore, it is possible to achieve a lens system having high image formation performance from a center of an angle of view through a peripheral portion of the angle of view, and in which especially a longitudinal chromatic aberration and a chromatic aberration in a peripheral portion of an image formation area are excellently corrected while the total length of the imaging lens is reduced. Especially, when the focal length of the second lens and the focal length of the fourth lens satisfy formula (2), it is possible to balance the power of the second lens and the power of the fourth lens. Therefore, it is possible to excellently maintain performance in a central portion of the image formation area and a peripheral portion of the image formation area. Further, when the refractive index of the third lens and the refractive index of the fifth lens satisfy formulas (3), respectively, the third lens and the fifth lens can be composed of lenses made of resin. Therefore, it is possible to excellently reduce the cost of the lens structure.

In the imaging lens of the present invention, more excellent optical performance is achievable further by adopting and satisfying a desirable structure, as described next.

It is desirable that the imaging lens of the present invention satisfies the following conditional formula. When the focal length of the second lens and the focal length of the fourth lens further satisfy conditional formula (2-1), it is possible to balance the power of the second lens and the power of the second lens in a more desirable manner. Therefore, it is possible to more excellently maintain performance in the central portion of the image formation area and the peripheral portion of the image formation area:

$$1.1 < f2/f4 < 2.8 \quad (2\text{-}1).$$

It is desirable that the imaging lens of the present invention satisfies the following conditional formulas. When the refractive index of the third lens and the refractive index of the fifth lens satisfy formulas (3-1), respectively, the third lens and the fifth lens can be composed of lenses made of resin. Therefore, it is possible to more desirably reduce the cost of the lens structure:

$$Nd3 < 1.58 \text{ and } Nd5 < 1.58 \quad (3\text{-}1).$$

It is desirable that the imaging lens of the present invention satisfies the following conditional formulas. When conditional formula (1) about the second lens is satisfied, Abbe number vd2 is reduced, and dispersion increases. Therefore, it is possible to excellently correct a longitudinal chromatic aberration. Further, it is possible to maintain resolving power in a central portion of the image formation area. It is more desirable that conditional formula (1-1) is satisfied to further enhance this effect:

$$vd2 < 35 \quad (1); \text{ and}$$

$$vd2 < 30 \quad (1\text{-}1), \text{ where}$$

vd2: an Abbe number of the second lens for d-line.

It is desirable that the imaging lens of the present invention satisfies the following conditional formulas. When conditional formulas (4) about the third lens and the fifth lens are satisfied, Abbe number vd3 and Abbe number vd5 are increased, and dispersion is reduced. Therefore, it is possible to excellently correct a longitudinal chromatic aberration. It is more desirable that conditional formulas (4-1) are satisfied to further enhance this effect:

$$50 < vd3 \text{ and } 50 < vd5 \quad (4); \text{ and}$$

$$53 < vd3 \text{ and } 53 < vd5 \quad (4\text{-}1), \text{ where}$$

vd3: an Abbe number of the third lens for d-line, and
vd5: an Abbe number of the fifth lens for d-line.

It is desirable that the imaging lens of the present invention satisfies the following conditional formula (5). Then, it is possible to reduce the total length in a desirable manner. Further, it is possible to improve the optical performance in a central portion of the image formation area. Further, it is more desirable that conditional formula (5-1) is satisfied to further enhance this effect:

$$vd4 < 35 \quad (5); \text{ and}$$

$$vd4 < 30 \quad (5\text{-}1), \text{ where}$$

vd4: an Abbe number of the fourth lens for d-line.

In the imaging lens of the present invention, it is desirable that an aperture stop is arranged on the object side of the first lens. Then, it is possible to set a longer distance between an image formation surface and a pupil relative to the total length of the imaging lens. Therefore, it is possible to reduce an angle of incidence of rays entering an imaging device. Hence, it is possible to achieve higher optical performance.

An imaging apparatus of the present invention includes an imaging lens of the present invention.

According to the imaging apparatus of the present invention, it is possible to obtain high resolution imaging signals based on a high resolution optical image obtained by the imaging lens of the present invention.

According to the imaging lens of the present invention, the structure of each lens element is optimized in a lens structure of five lenses in total. The imaging lens is structured in such a manner that especially the dispersion of the second, third and fifth lenses become appropriate. Further, a ratio of the focal length of the second lens to the focal length of the fourth lens is set in a desirable manner. Therefore, it is possible to achieve a lens system having high image formation performance from a center of an angle of view through a peripheral portion of the angle of view, and in which especially a longitudinal chromatic aberration is excellently corrected while the total length of the imaging lens is reduced.

Further, according to the imaging apparatus of the present invention, imaging signals based on an optical image formed by the high performance imaging lens of the present invention are output. Therefore, a high resolution photography image is obtainable based on the imaging signals.

BRIEF DESCRIPTION OF THE DRAWINGS

FIG. 13 is aberration diagrams illustrating various aberrations of an imaging lens in Example 1 of the present invention, and Section A illustrates a spherical aberration, and Section B illustrates astigmatism (curvature of field), and Section C illustrates distortion;

FIG. 14 is aberration diagrams illustrating various aberrations of an imaging lens in Example 2 of the present invention, and Section A illustrates a spherical aberration, and Section B illustrates astigmatism (curvature of field), and Section C illustrates distortion;

FIG. 15 is aberration diagrams illustrating various aberrations of an imaging lens in Example 3 of the present invention, and Section A illustrates a spherical aberration, and Section B illustrates astigmatism (curvature of field), and Section C illustrates distortion;

FIG. 16 is aberration diagrams illustrating various aberrations of an imaging lens in Example 4 of the present invention, and Section A illustrates a spherical aberration, and Section B illustrates astigmatism (curvature of field), and Section C illustrates distortion;

FIG. 17 is aberration diagrams illustrating various aberrations of an imaging lens in Example 5 of the present invention, and Section A illustrates a spherical aberration, and Section B illustrates astigmatism (curvature of field), and Section C illustrates distortion;

FIG. 18 is aberration diagrams illustrating various aberrations of an imaging lens in Example 6 of the present invention, and Section A illustrates a spherical aberration, and Section B illustrates astigmatism (curvature of field), and Section C illustrates distortion;

FIG. 19 is aberration diagrams illustrating various aberrations of an imaging lens in Example 7 of the present invention, and Section A illustrates a spherical aberration, and Section B illustrates astigmatism (curvature of field), and Section C illustrates distortion;

FIG. 20 is aberration diagrams illustrating various aberrations of an imaging lens in Example 8 of the present invention, and Section A illustrates a spherical aberration, and Section B illustrates astigmatism (curvature of field), and Section C illustrates distortion;

FIG. 21 is aberration diagrams illustrating various aberrations of an imaging lens in Example 9 of the present invention, and Section A illustrates a spherical aberration, and Section B illustrates astigmatism (curvature of field), and Section C illustrates distortion;

FIG. 22 is aberration diagrams illustrating various aberrations of an imaging lens in Example 10 of the present invention, and Section A illustrates a spherical aberration, and Section B illustrates astigmatism (curvature of field), and Section C illustrates distortion;

FIG. 23 is aberration diagrams illustrating various aberrations of an imaging lens in Example 11 of the present invention, and Section A illustrates a spherical aberration, and Section B illustrates astigmatism (curvature of field), and Section C illustrates distortion;

FIG. 24 is aberration diagrams illustrating various aberrations of an imaging lens in Example 12 of the present invention, and Section A illustrates a spherical aberration, and Section B illustrates astigmatism (curvature of field), and Section C illustrates distortion;

DESCRIPTION OF THE PREFERRED EMBODIMENTS

With reference to drawings, embodiments of the present invention will be described in detail.

Figure 1:
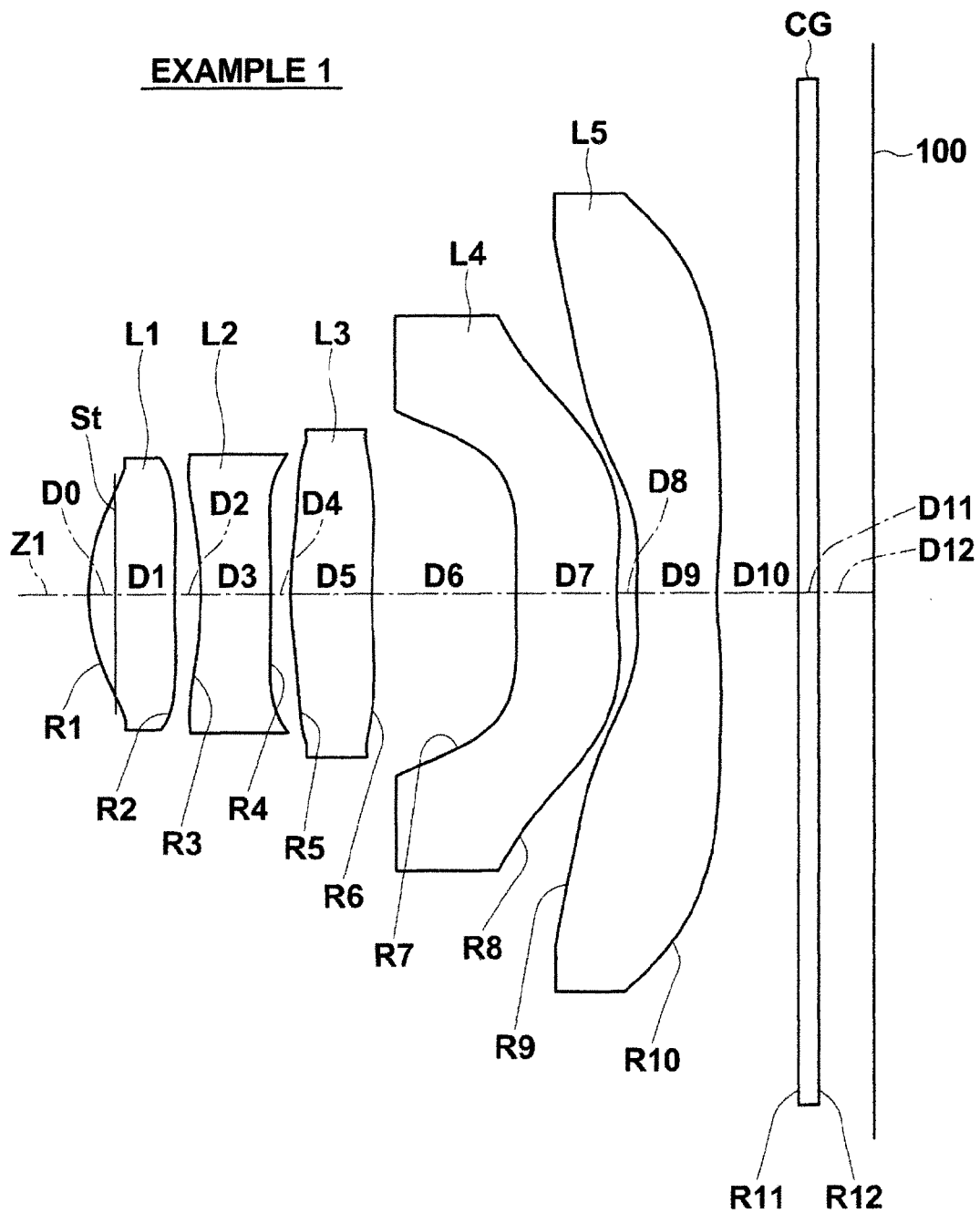
FIG. 1 is a diagram illustrating a first structural example of an imaging lens according to an embodiment of the present invention, and which is a lens cross section corresponding to Example 1.

FIG. 1 is a diagram illustrating a first structural example of an imaging lens according to an embodiment of the present invention. This structural example corresponds to a lens structure of a first numerical value example (Table 1 and Table 13), which will be described later. Similarly, FIG. 2 through FIG. 12 illustrate cross sections of second through 12th structural examples, which correspond to lens structures of second through 12th numerical value examples (Table 2 through Table 12 and Tables 14 through 24), which will be described later. In FIG. 1 through FIG. 12, sign Ri represents the curvature radius of an i-th surface when the most object-side surface of lens elements is the first surface, and signs are assigned in such a manner that the value of i sequentially increases toward the image side (image formation side). Sign Di represents a distance on optical axis Z1 between the i-th surface and (i+1)th surface. Here, the basic structure of each example is the same. Therefore, basically, the structural example of the imaging lens illustrated in FIG. 1 will be described, and structural examples illustrated in FIG. 2 through FIG. 12 will be also described, if necessary.

Imaging lens L according to an embodiment of the present invention is appropriate to be used in various kinds of imaging equipment using an imaging device, such as a CCD and a CMOS. Especially, imaging lens L is appropriate for a relatively small-sized mobile terminal equipment, for example, such as a digital still camera, a cellular phone with a camera, a smartphone, a tablet terminal and a PDA. This imaging lens L includes, along optical axis Z1, first lens L1, second lens L2, third lens L3, fourth lens L4 and fifth lens L5 in this order from the object side.

Figure 25:
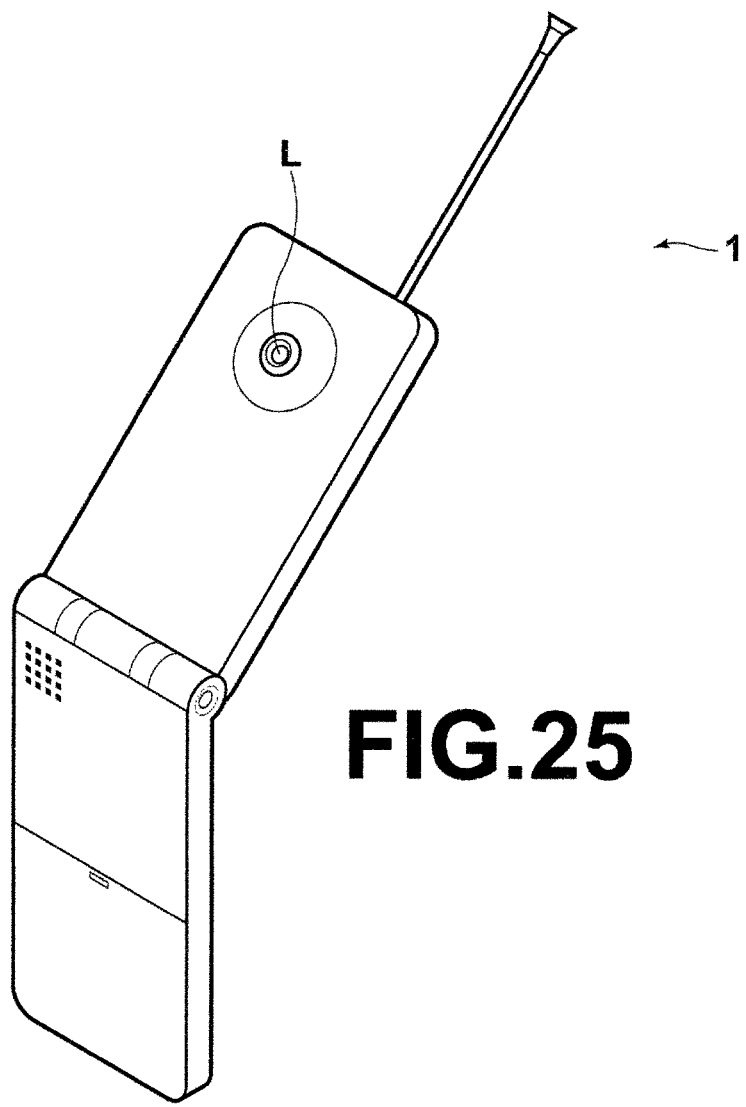
FIG. 25 is a diagram illustrating an imaging apparatus that is a cellular phone terminal including an imaging lens of the present invention.

FIG. 25 is a schematic diagram illustrating a cellular phone terminal, which is an imaging apparatus 1 according to an embodiment of the present invention. The imaging apparatus 1 according to the embodiment of the present invention includes imaging lens L according to an embodiment of the present invention and an imaging device 100, such as a CCD, which outputs imaging signals based on an optical image formed by imaging lens L (please refer to FIG. 1). The imaging device 100 is arranged at an image formation surface of imaging lens L (imaging surface).

Figure 26:
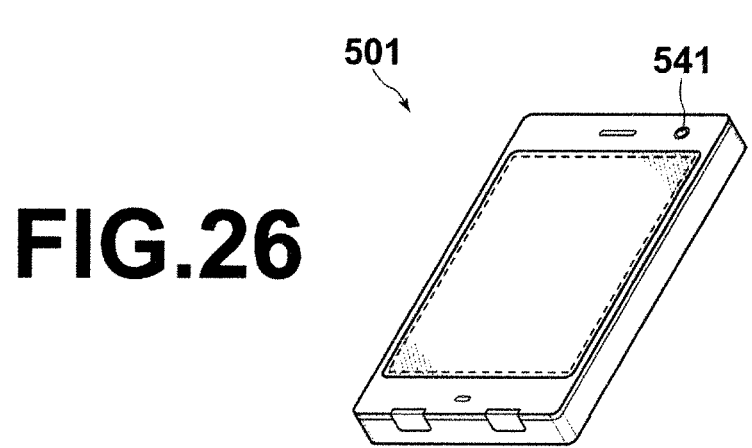
FIG. 26 is a diagram illustrating an imaging apparatus that is a smartphone including an imaging lens of the present invention.

FIG. 26 is a schematic diagram illustrating a smartphone, which is an imaging apparatus 501 according to an embodiment of the present invention. The imaging apparatus 501 according to the embodiment of the present invention includes a camera unit 541 including imaging lens L according to an embodiment of the present invention and an imaging device 100, such as a CCD, which outputs imaging signals based on an optical image formed by imaging lens L (please refer to FIG. 1). The imaging device 100 is arranged at an image formation surface of imaging lens L (imaging surface).

Various kinds of optical member CG may be arranged between fifth lens L5 and the imaging device 100 based on the structure of a camera on which a lens is mounted. For example, a flat-plate-shaped optical member, such as a cover glass for protecting an imaging surface and an infrared-ray cut filter, may be arranged. In this case, for example, a flat-plate-shaped cover glass to which coating having an effect of a filter, such as an infrared-ray cut filter and an ND filter, has been applied may be used as optical member CG.

Alternatively, an effect similar to optical member CG may be given to fifth lens L5 or the like by applying coating to fifth lens L5 or the like without using optical member CG. Then, it is possible to reduce the number of parts, and to reduce the total length.

Further, this imaging lens L includes aperture stop St. Aperture stop St is an optical aperture stop. It is desirable that aperture stop St is arranged immediately on the front or rear side of first lens L1. For example, it is desirable that aperture stop St is a so-called "front stop", which is arranged on the most object side. Here, the term "front stop" means that the position of an aperture stop in the optical axis direction is the same as an intersection of an axial marginal ray and the object-side surface of first lens L1 or located on the object side of the intersection. In the embodiments of the present invention, lenses of the first through 12th structural examples (FIG. 1 through FIG. 12) correspond to the front stop. When a front stop is adopted, it is possible to set a longer distance between an image formation surface and a pupil relative to the total length. Therefore, it is possible to reduce the angle of incidence of rays entering the imaging device. Hence, it is possible to achieve higher optical performance.

This imaging lens L adopts an aspherical surface for at least one of the surfaces of each of first lens L1 through fifth lens L5 to achieve higher performance.

In this imaging lens L, first lens L1 has positive refractive power in the vicinity of the optical axis. First lens L1 has a convex surface facing the object side in the vicinity of the optical axis. Therefore, it is possible to easily correct a spherical aberration.

Second lens L2 has negative refractive power in the vicinity of the optical axis. Second lens L2 has a concave surface facing the object side in the vicinity of the optical axis. Therefore, it is possible to reduce a longitudinal chromatic aberration.

Third lens L3 has positive refractive power in the vicinity of the optical axis. Third lens L3 has a meniscus shape with its convex surface facing the object side in the vicinity of the optical axis. Therefore, it is possible to reduce the total length in a desirable manner.

Fourth lens L4 has negative refractive power in the vicinity of the optical axis. A "peripheral portion" of fourth lens L4 has a shape in which tangent lines to the image-side surface of fourth lens L4 intersect the optical axis on the image side of the image-side surface. Here, the term "peripheral portion" means a portion on the outside of 60% of the effective diameter of the lens from the optical axis in the direction of the radii of the lens. As described above, the image-side surface of fourth lens L4 has a concave surface facing the image side in the vicinity of the optical axis, and a peripheral portion of the image-side surface has a shape in which tangent lines to the image-side surface intersect the optical axis on the image side of the image-side surface. Therefore, it is possible to reduce generation of a longitudinal chromatic aberration and a lateral chromatic aberration. Especially when not only the image-side surface of fourth lens L4 but also the object-side surface of fourth lens L4 has a shape in which tangent lines to the object-side surface intersect the optical axis on the image side of the object-side surface, the aforementioned effects are more remarkable.

Fifth lens L5 has positive refractive power in the vicinity of the optical axis. Fifth lens L5 has a convex surface facing the object side in the vicinity of the optical axis.

Each of lenses L1 through L5 constituting imaging lens L is not a cemented lens but a single lens. Therefore, there are a larger number of aspherical surfaces, compared with a case in which at least one of lenses L1 through L5 is a cemented lens. Hence, it is possible to more flexibly design each lens, and to reduce the total length in a desirable manner.

Next, the action and effect of imaging lens L, which is structured as described above, will be described. Especially, the action and effect about conditional formulas will be described in detail.

First, it is desirable that Abbe number vd2 of second lens L2 for d-line satisfies the following conditional formula (1):

$$vd2 < 35 \tag{1}$$

If second lens L2 exceeds the upper limit of conditional formula (1), a longitudinal chromatic aberration increases, and resolving power in a central portion of the image formation area deteriorates. When conditional formula (1) about second lens L2 is satisfied, Abbe number vd2 is reduced, and dispersion as a negative lens increases. Therefore, it is possible to excellently correct a longitudinal chromatic aberration, and to maintain resolving power in the central portion of the image formation area in a desirable manner. From the view as described above, it is more desirable that conditional formula (1-1) is satisfied. It is even more desirable that conditional formula (1-2) is satisfied:

$$vd2 < 30 \tag{1-1; and}$$

$$vd2 < 25 \tag{1-2}$$

Focal length f2 of the second lens and focal length f4 of the fourth lens satisfy the following conditional formula (2):

$$1 < f2/f4 < 3 \tag{2}$$

If focal length f2 of second lens L2 and focal length f4 of fourth lens L4 are lower than the lower limit of formula (2), the negative refractive power of second lens L2 becomes strong, compared with the negative refractive power of fourth lens L4. Although it is possible to obtain excellent performance in a central portion of the image formation area, performance in a peripheral portion of the image formation area deteriorates. Therefore, chromatic aberrations in the peripheral portion of the image formation area and chromatic aberrations in the central portion of the image formation area become unbalanced. Hence, when focal length f2 of second lens L2 and focal length f4 of fourth lens L4 satisfy the lower limit of formula (2), it is possible to balance the power of the second lens and the power of the fourth lens so that the power of second lens L2 does not become too strong, compared with the power of fourth lens L4. Therefore, it is possible to excellently maintain performance in the peripheral portion of the image formation area while improving performance in the central portion of the image formation area. If the focal length of the second lens and the focal length of the fourth lens exceed the upper limit of formula (2), the power of second lens L2 becomes weak, compared with the power of fourth lens L4. Although it is possible to excellently correct chromatic aberrations in the peripheral portion of the image formation area, chromatic aberrations in the central portion of the image formation area deteriorate. Therefore, chromatic aberrations in the peripheral portion of the image formation area and chromatic aberrations in the central portion of the image formation area become unbalanced. Hence, when focal length f2 of second lens L2 and focal length f4 of fourth lens L4 satisfy the upper limit of formula (2), it is possible to balance the power of the second lens and the power of the fourth lens so that the power of fourth lens L4 does not become too strong, compared with the power of second lens L2. Therefore, it is possible to excellently maintain chromatic aberrations in the central portion of the image formation area while correcting chromatic aberrations in the peripheral portion of the image formation area in an excellent manner. From the view as described above, it is more desirable that conditional formula (2-1) is satisfied. It is even more desirable that conditional formula (2-2) is satisfied:

$$1.1 < f2/f4 < 2.8 \quad (2\text{-}1); \text{ and}$$

$$1.2 < f2/f4 < 2.7 \quad (2\text{-}2).$$

Refractive index Nd3 of the third lens and refractive index Nd5 of the fifth lens satisfy the following conditional formulas (3):

$$Nd3 < 1.6 \text{ and } Nd5 < 1.6 \quad (3).$$

When refractive index Nd3 of the third lens and refractive index Nd5 of the fifth lens satisfy formulas (3), respectively, the third lens and the fifth lens can be composed of lenses made of resin. In this case, it is possible to accurately produce an aspherical surface shape. Further, it is possible to reduce the weight and the cost of the lenses. From the view as described above, it is more desirable that conditional formulas (3-1) are satisfied. It is even more desirable that conditional formulas (3-2) are satisfied:

$$Nd3 < 1.58 \text{ and } Nd5 < 1.58 \quad (3\text{-}1); \text{ and}$$

$$Nd3 < 1.55 \text{ and } Nd5 < 1.55 \quad (3\text{-}2).$$

It is desirable that Abbe number vd3 of the third lens for d-line and Abbe number vd5 of the fifth lens for d-line satisfy the following conditional formulas (4):

$$50 < vd3 \text{ and } 50 < vd5 \quad (4).$$

If Abbe number vd3 of the third lens for d-line and Abbe number vd5 of the fifth lens for d-line are lower than the lower limit of conditional formulas (4), correction of a longitudinal chromatic aberration becomes difficult. Therefore, when conditional formulas (4) are satisfied, Abbe numbers vd3 and vd5 are increased, and dispersion is reduced. Therefore, it is possible to excellently correct a longitudinal chromatic aberration. From the view as described above, it is more desirable that conditional formulas (4-1) are satisfied. It is even more desirable that conditional formulas (4-2) are satisfied:

$$53 < vd3 \text{ and } 53 < vd5 \quad (4\text{-}1); \text{ and}$$

$$54 < vd3 \text{ and } 54 < vd5 \quad (4\text{-}2).$$

Further, it is desirable that Abbe number vd4 of the fourth lens for d-line satisfies the following conditional formula:

$$vd4 < 35 \quad (5).$$

If Abbe number vd4 of the fourth lens for d-line exceeds the upper limit of conditional formula (5), it becomes difficult to further improve optical performance in a central portion of the image formation area, while reducing the total length in a desirable manner. Therefore, when Abbe number vd4 of the fourth lens for d-line satisfies conditional formula (5), it is possible to reduce the total length in a desirable manner. Further, it is possible to improve optical performance in the central portion of the image formation area. From the view as described above, it is more desirable that conditional formula (5-1) is satisfied. It is even more desirable that conditional formula (5-2) is satisfied:

$$vd4 < 30 \quad (5\text{-}1); \text{ and}$$

$$vd4 < 25 \quad (5\text{-}2).$$

As described above, according imaging lens L of an embodiment of the present invention, the structure of each lens element is optimized in a structure of five lenses in total. Especially, a ratio of the focal length of the second lens to the focal length of the fourth lens is set in a desirable manner. Therefore, it is possible to achieve a lens system having high image formation performance from a center of an angle of view through a peripheral portion of the angle of view, in which especially a longitudinal chromatic aberration is excellently corrected, while reducing the total length.

Further, when a desirable condition or conditions are appropriately satisfied, a product is appropriate for production, and more excellent image formation performance is achievable. Further, an imaging apparatus according to an embodiment of the present invention outputs imaging signals based on an optical image formed by high performance imaging lens L according to an embodiment of the present invention. Therefore, it is possible to obtain a high resolution photography image from a center of an angle of view through a peripheral portion of the angle of view.

Next, specific numerical value examples of imaging lenses according to embodiments of the present invention will be described. Plural numerical value examples will be described collectively.

Table 1 and Table 13, which will be given later in this specification, show specific lens data corresponding to the structure of the imaging lens illustrated in FIG. 1. Specifically, Table 1 shows basic lens data, and Table 13 shows data about aspherical surfaces. In the lens data of Table 1, the column of surface number Si shows the surface number of the i-th surface for the imaging lens of Example 1. The most-object-side surface of the lens elements is the first surface (aperture stop St is the 0th surface), and surface numbers sequentially increase toward the image side. The column of curvature radius Ri shows the value (mm) of the curvature radius of the i-th surface from the object side, which corresponds to sign Ri assigned in FIG. 1. Similarly, the column of surface distance Di shows a distance (mm) on an optical axis between the i-th surface Si and the (i+1)th surface Si+1 from the object side. The column of Ndj shows the value of a refractive index of a j-th optical element from the object side for d-line (587.56 nm). The column of vdj shows the value of an Abbe number of the j-th optical element from the object side for d-line.

In the imaging lens of Example 1, both surfaces of all of first lens L1 through fifth lens L5 are aspherical. The basic lens data in Table 1 shows, as the curvature radius of each of the aspherical surfaces, the numerical value of a curvature radius in the vicinity of the optical axis (paraxial curvature radius).

Table 13 shows aspherical surface data in the imaging lens of Example 1. In the numerical values indicated as the aspherical surface data, the sign "E" represents that a number after the sign "E" is an "exponent" using 10 as a base, and that a value before the sign "E" is multiplied by a numerical value represented by the exponential function using 10 as the base. For example, "1.0E-02" means "$1.0 \times 10^{-2}$".

As aspherical surface data, values of coefficients Ai and K in the aspherical surface equation represented by the following equation (A) are shown. Specifically, Z represents the length (mm) of a perpendicular from a point on an aspherical surface at height h from an optical axis to a plane that contacts with the vertex of the aspherical surface (the plane is perpendicular to the optical axis).

$$Z = C \cdot h^2 / \{1 + (1 - K \cdot C^2 \cdot h^2)^{1/2}\} + \Sigma A_i \cdot h^i \quad (A),$$ where Z: the depth of the aspherical surface (mm),
h: a distance (height) from the optical axis to the lens surface (mm),
C: a paraxial curvature=1/R (R: a paraxial curvature radius),
Ai: the i-th order aspherical coefficient (i is an integer greater than or equal to 3), and
K: an aspherical coefficient.

Figure 2:
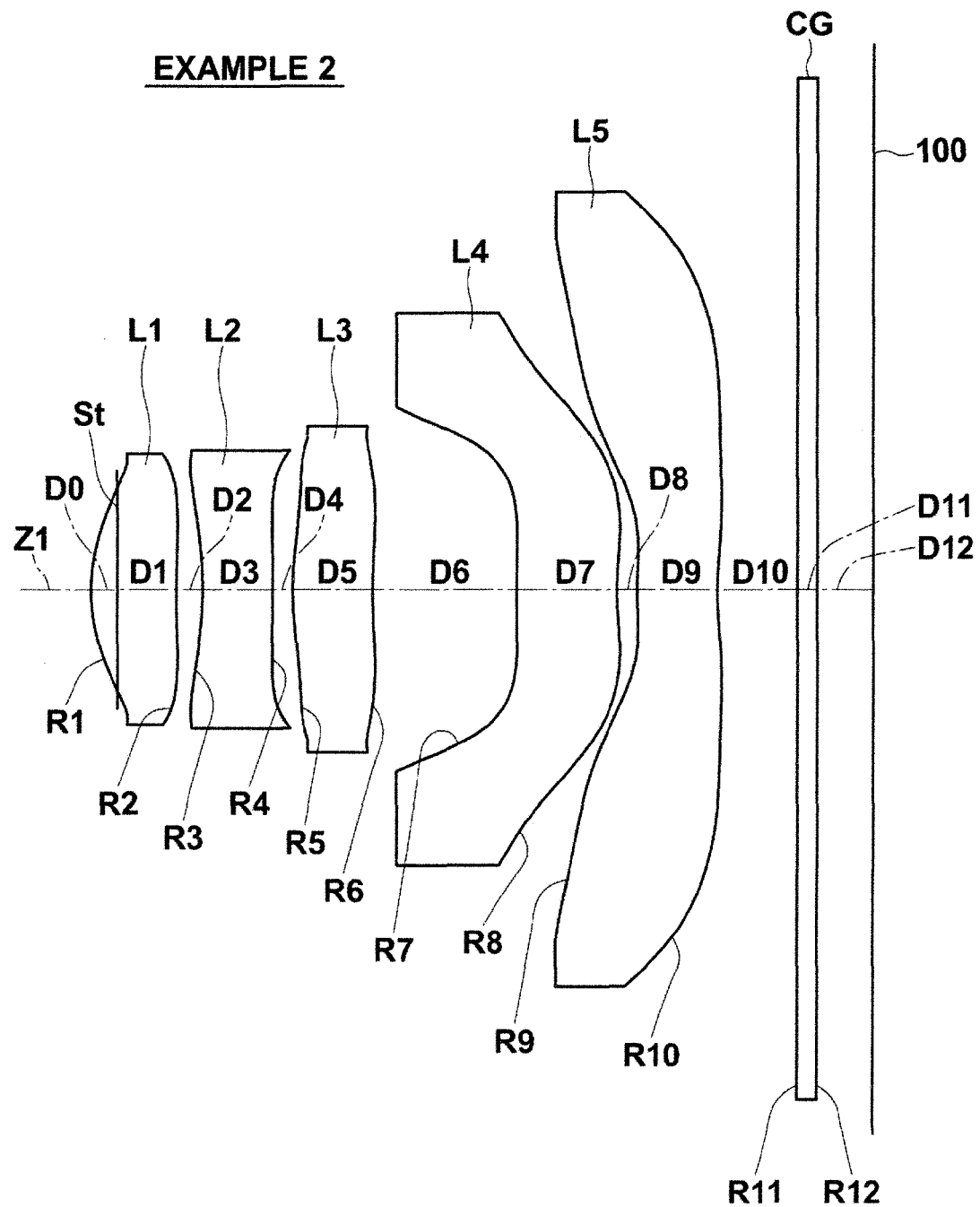
FIG. 2 is a diagram illustrating a second structural example of an imaging lens according to an embodiment of the present invention, and which is a lens cross section corresponding to Example 2.
Figure 3:
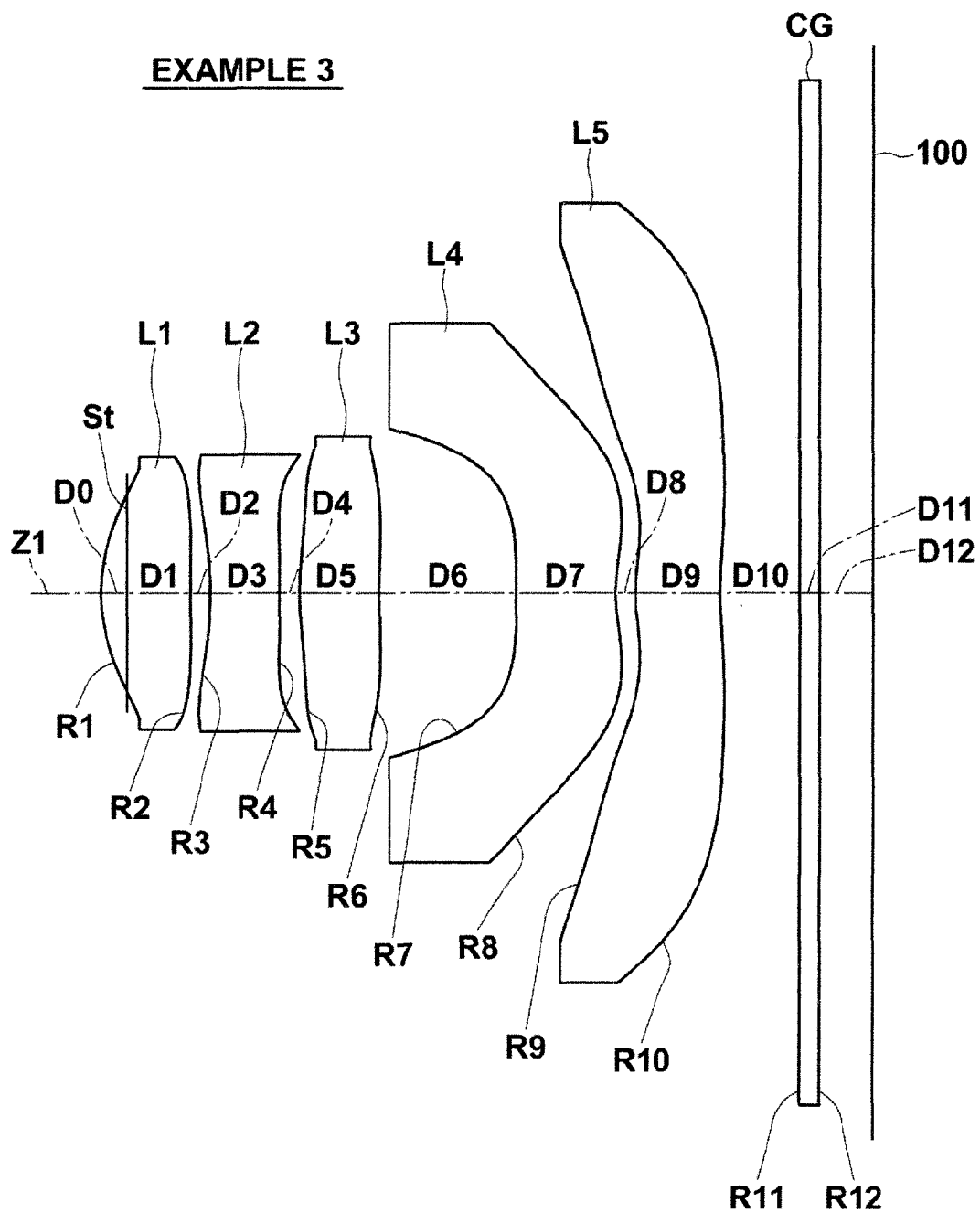
FIG. 3 is a diagram illustrating a third structural example of an imaging lens according to an embodiment of the present invention, and which is a lens cross section corresponding to Example 3.
Figure 4:
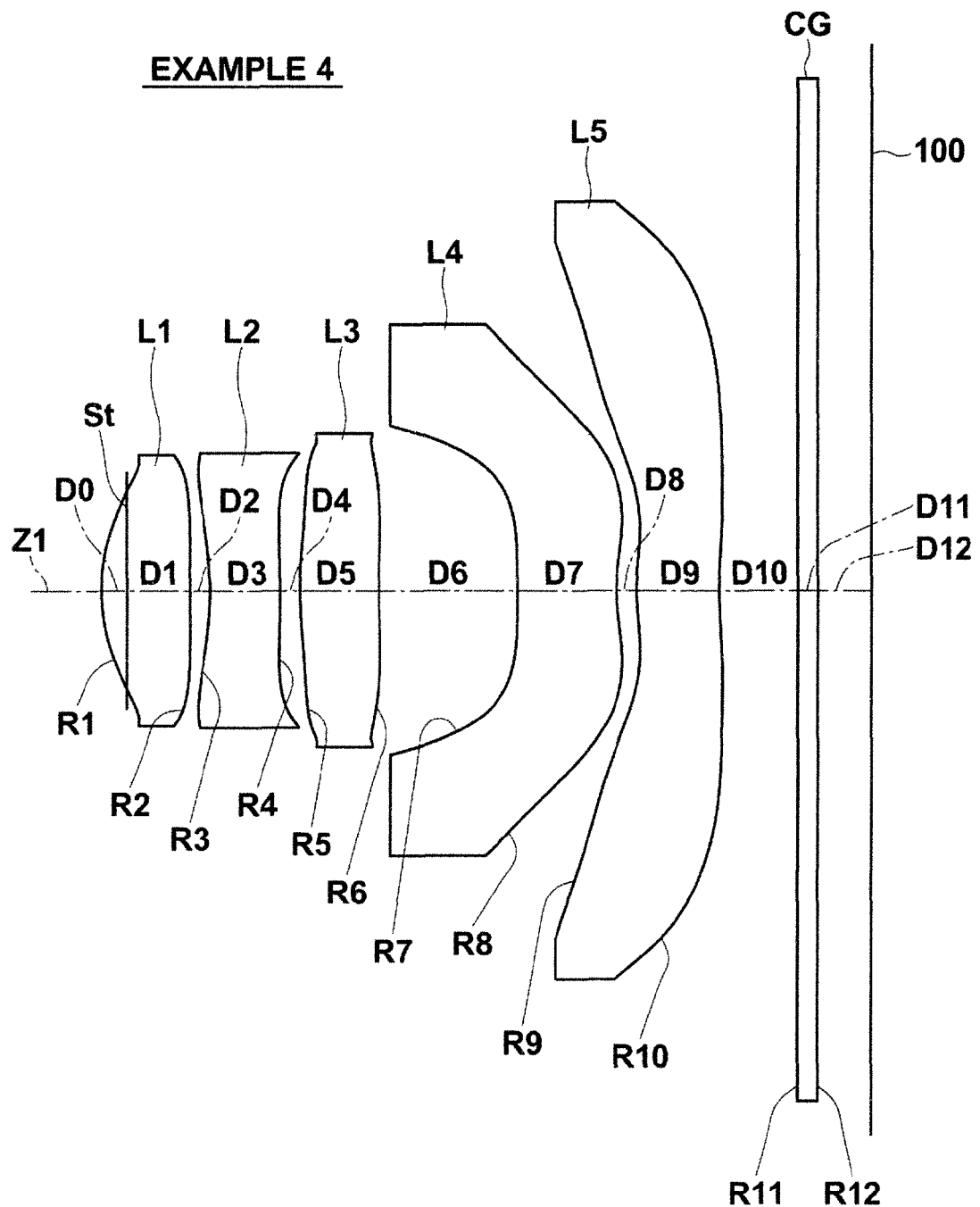
FIG. 4 is a diagram illustrating a fourth structural example of an imaging lens according to an embodiment of the present invention, and which is a lens cross section corresponding to Example 4.
Figure 5:
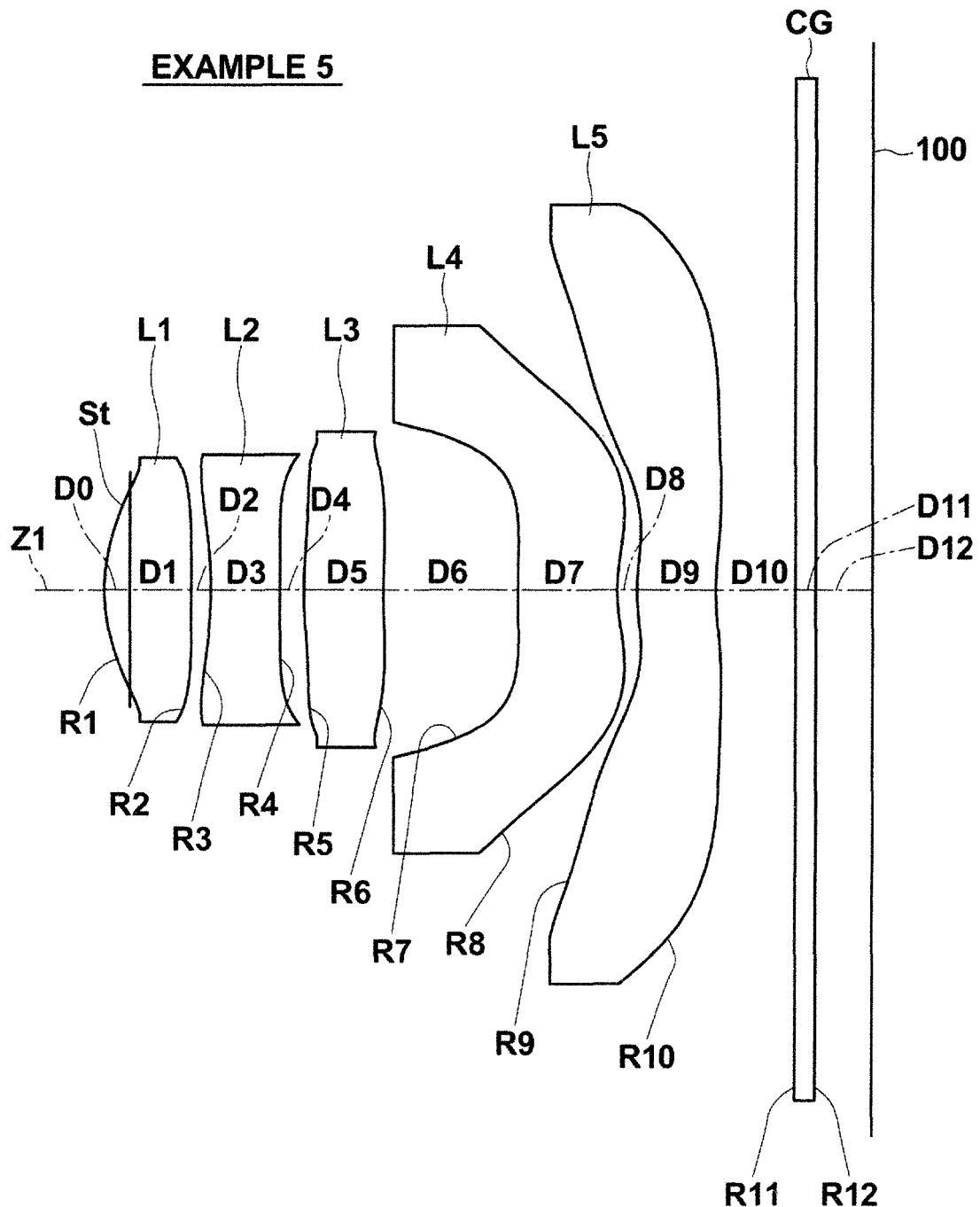
FIG. 5 is a diagram illustrating a fifth structural example of an imaging lens according to an embodiment of the present invention, and which is a lens cross section corresponding to Example 5.
Figure 6:
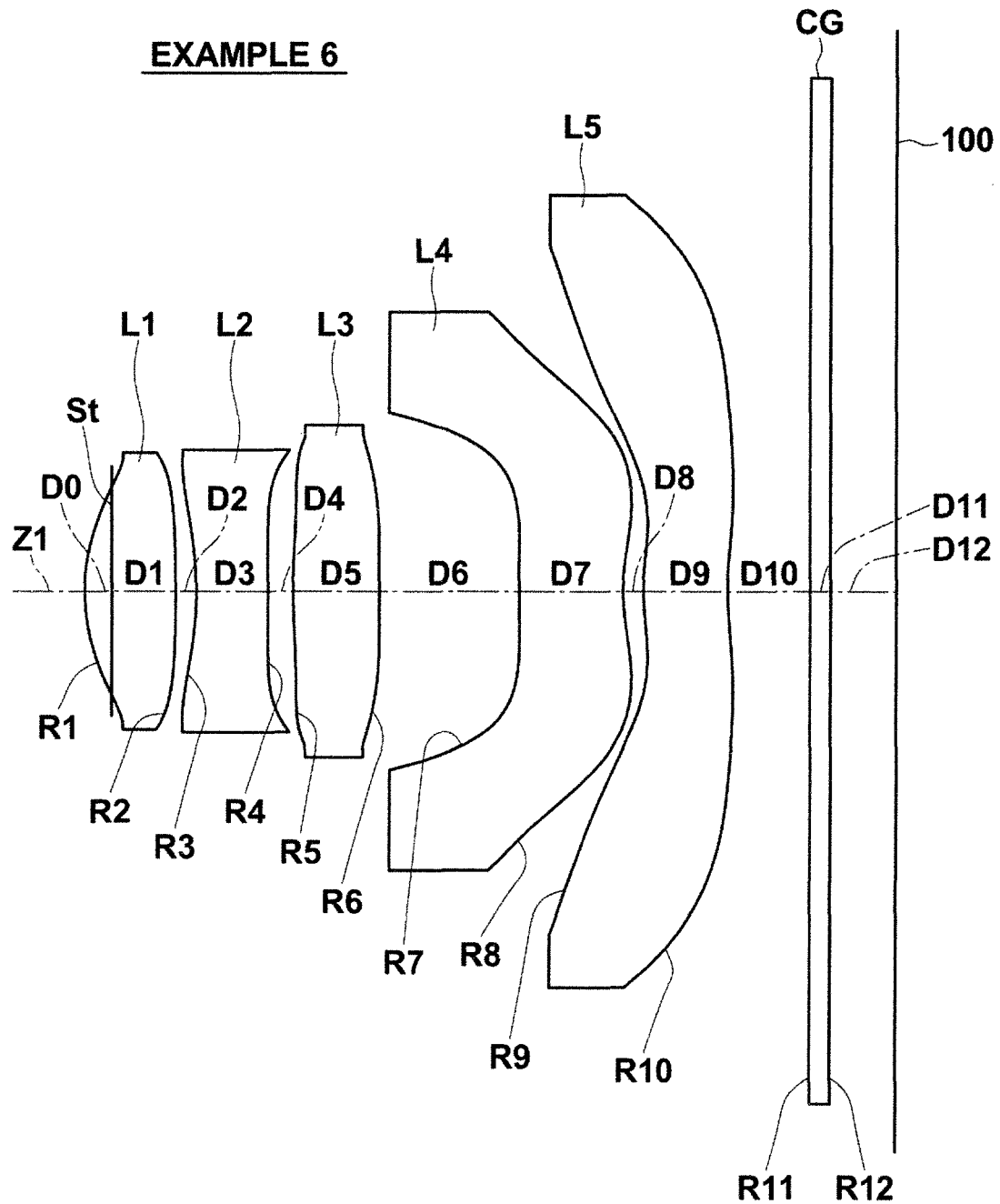
FIG. 6 is a diagram illustrating a sixth structural example of an imaging lens according to an embodiment of the present invention, and which is a lens cross section corresponding to Example 6.
Figure 7:
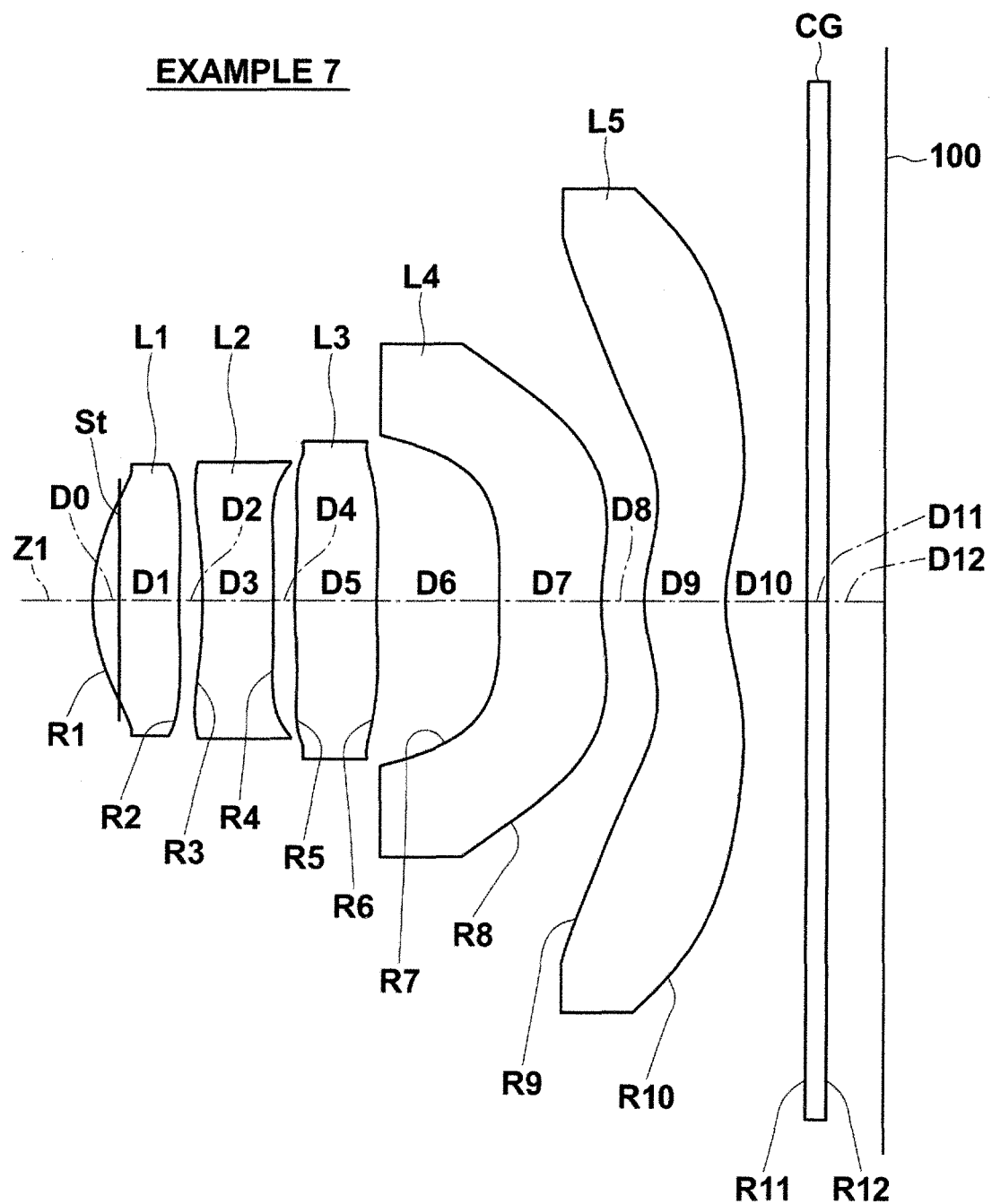
FIG. 7 is a diagram illustrating a seventh structural example of an imaging lens according to an embodiment of the present invention, and which is a lens cross section corresponding to Example 7.
Figure 8:
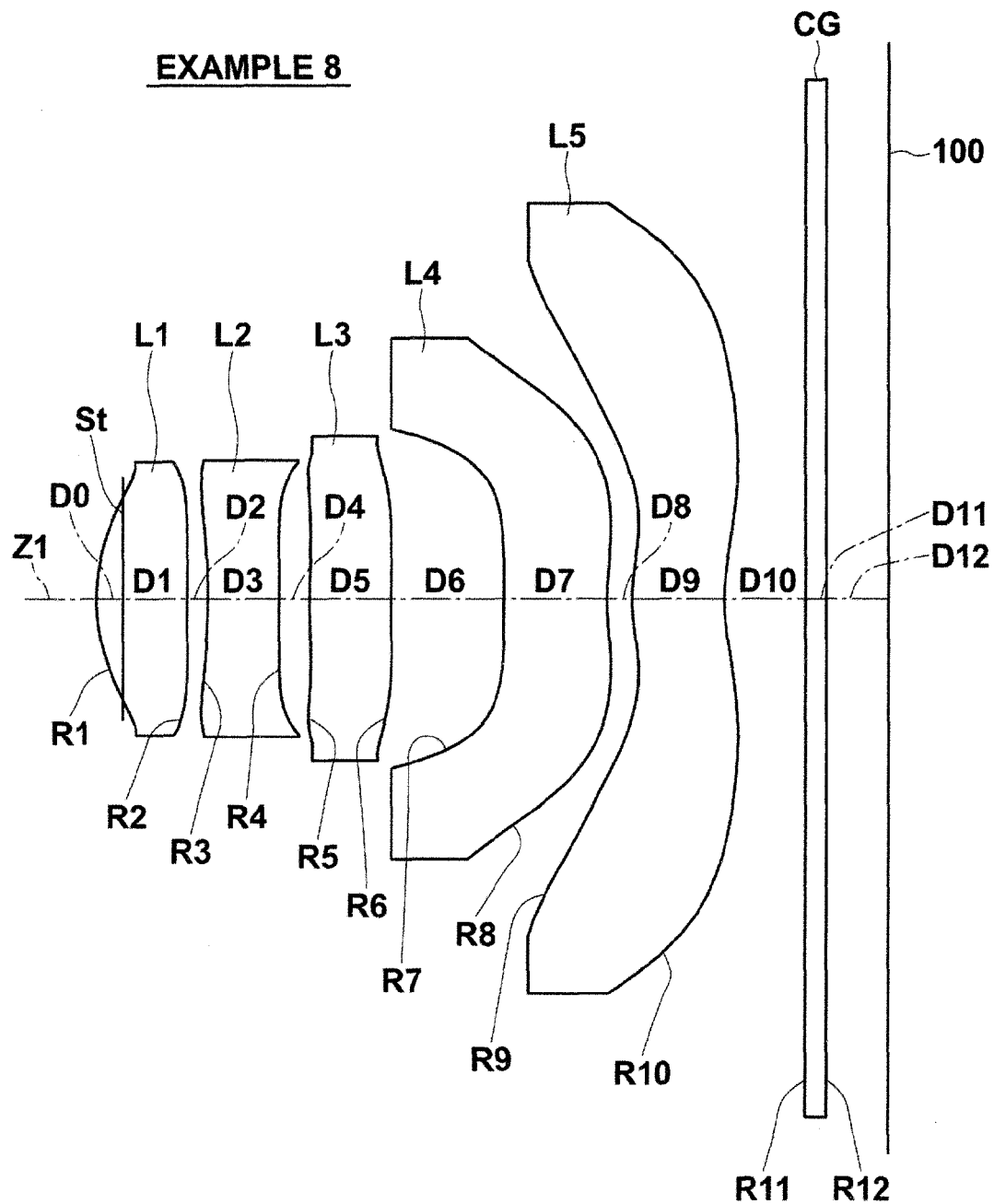
FIG. 8 is a diagram illustrating an eighth structural example of an imaging lens according to an embodiment of the present invention, and which is a lens cross section corresponding to Example 8.
Figure 9:
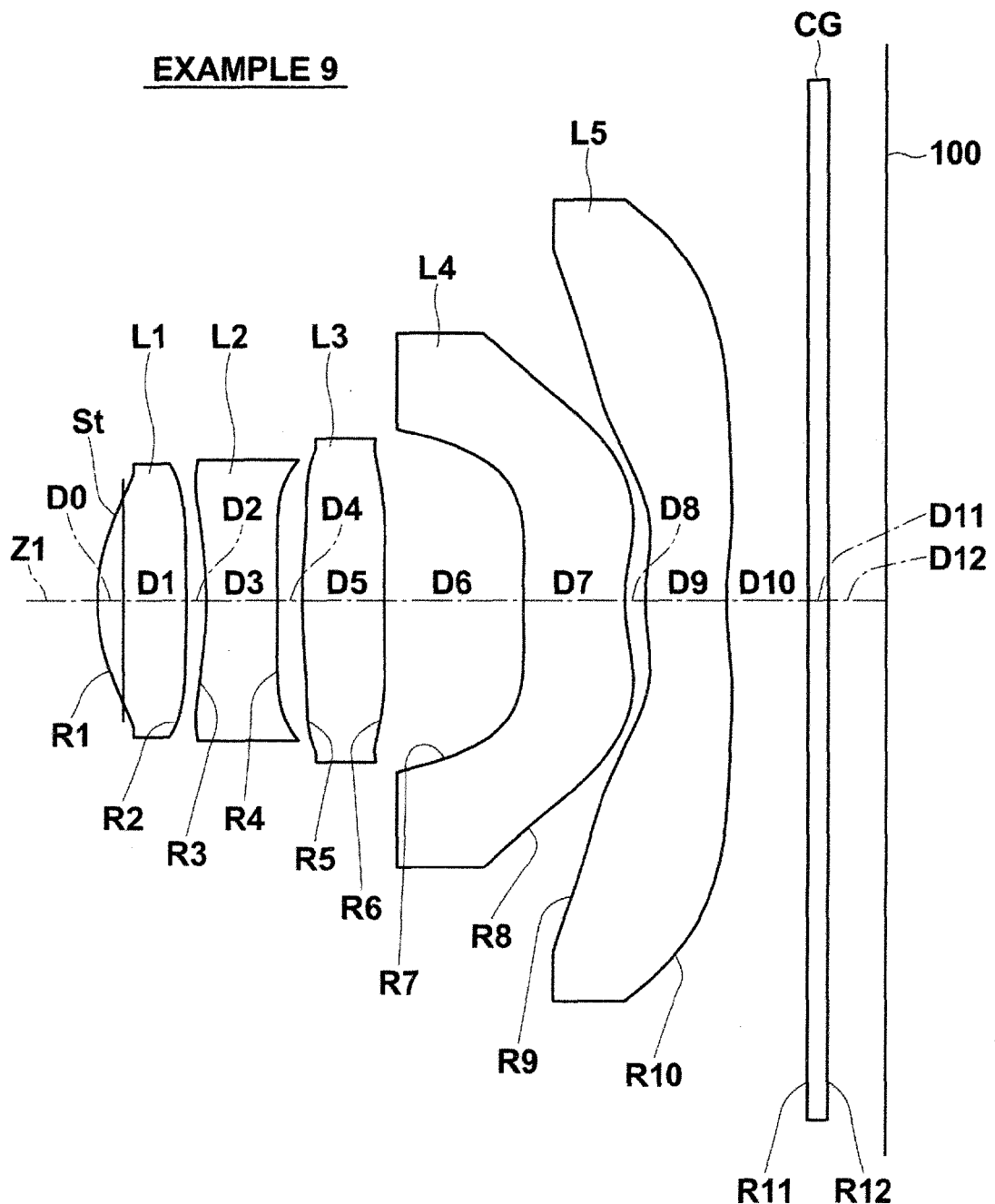
FIG. 9 is a diagram illustrating a ninth structural example of an imaging lens according to an embodiment of the present invention, and which is a lens cross section corresponding to Example 9.
Figure 10:
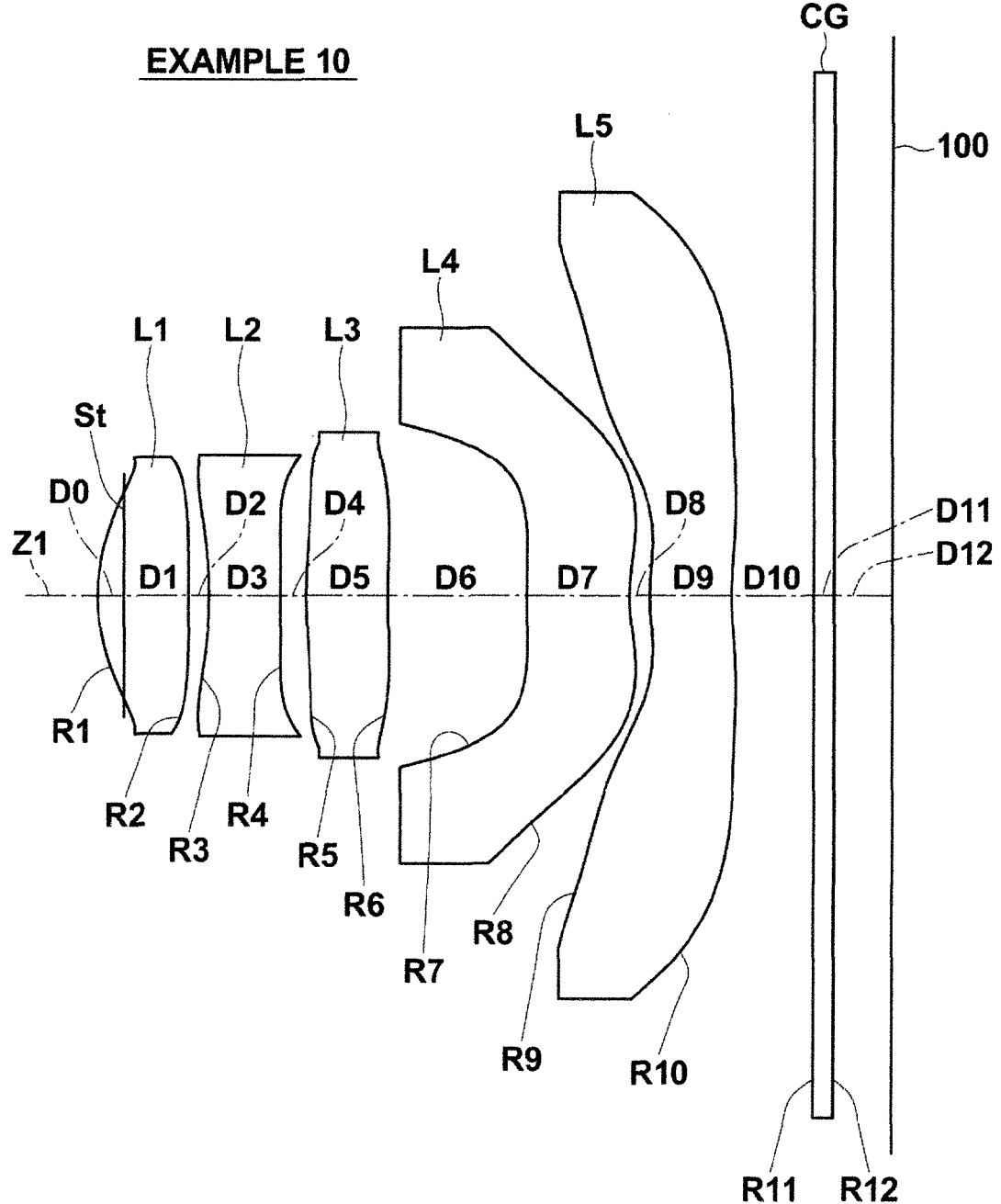
FIG. 10 is a diagram illustrating a tenth structural example of an imaging lens according to an embodiment of the present invention, and which is a lens cross section corresponding to Example 10.
Figure 11:
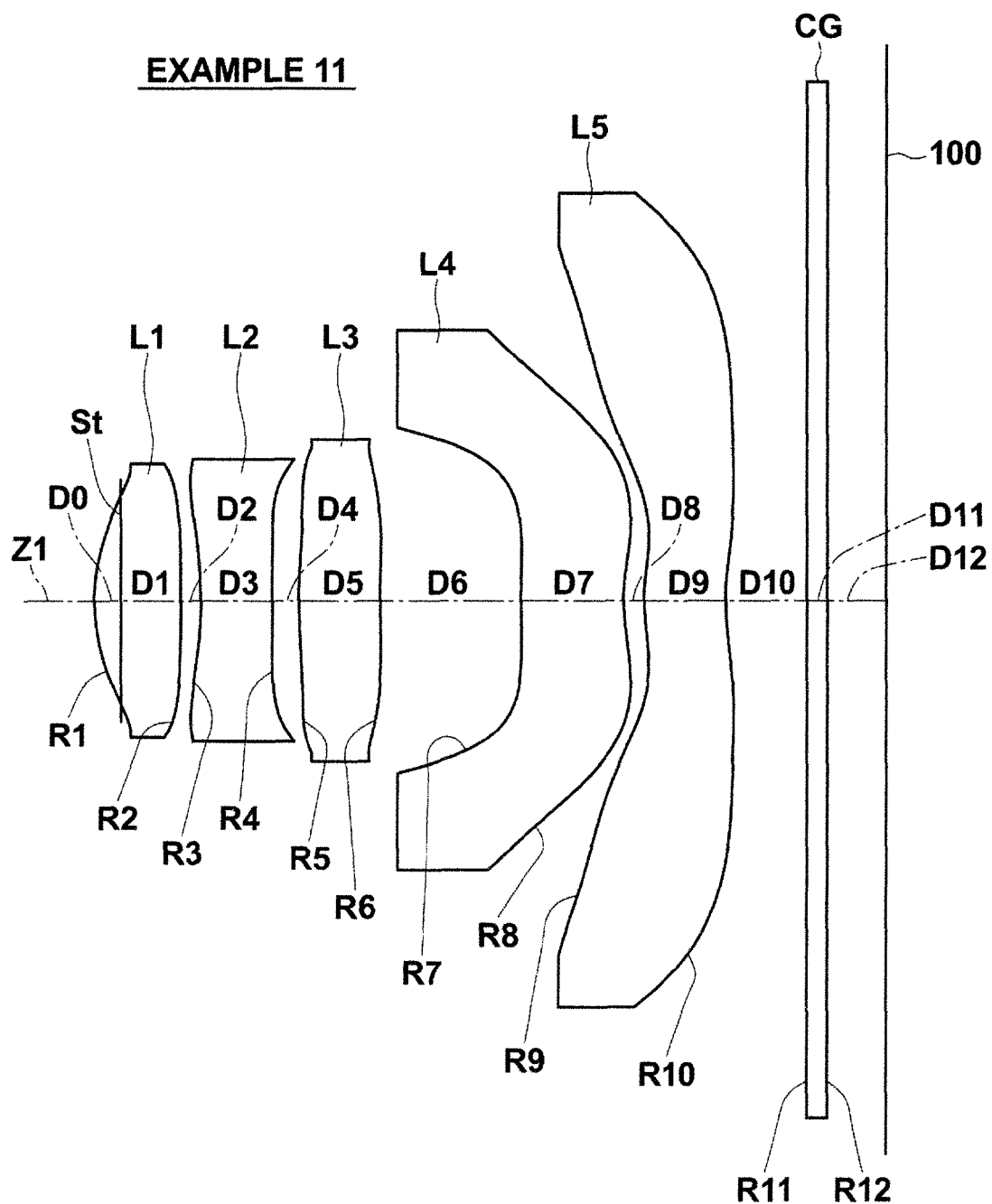
FIG. 11 is a diagram illustrating an eleventh structural example of an imaging lens according to an embodiment of the present invention, and which is a lens cross section corresponding to Example 11.
Figure 12:
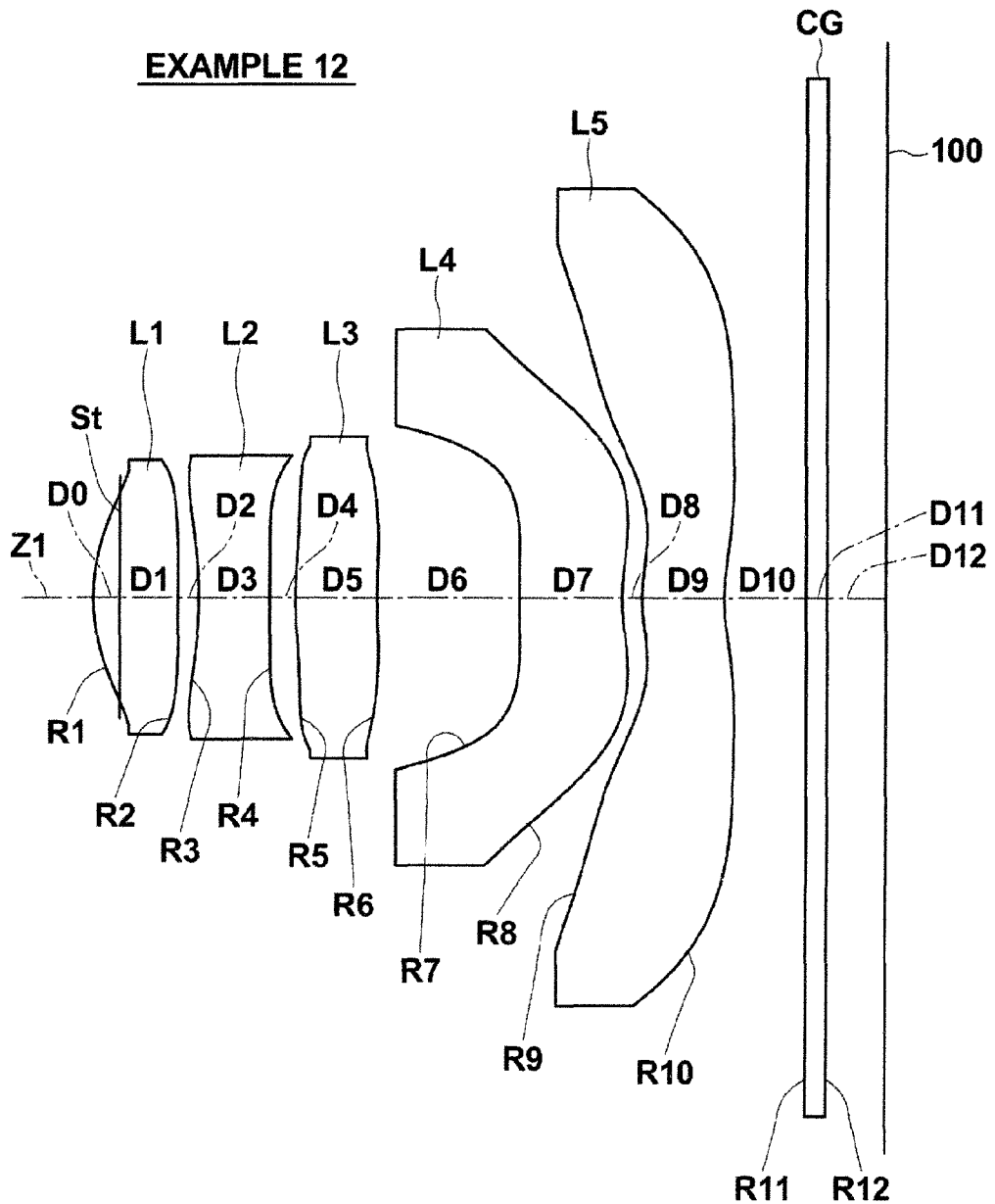
FIG. 12 is a diagram illustrating a twelfth structural example of an imaging lens according to an embodiment of the present invention, and which is a lens cross section corresponding to Example 12.

In a similar manner to the imaging lens of Example 1, as described above, Table 2 and Table 14 show, as Example 2, specific lens data corresponding to the structure of an imaging lens illustrated in FIG. 2. Similarly, Table 3 through Table 12 and Table 16 through Table 24 show, as Example 3 through Example 12, specific lens data corresponding the structure of imaging lenses illustrated in FIG. 3 through FIG. 12. In the imaging lenses of Examples 2 through 12, both surfaces of all of first lens L1 through fifth lens L5 are aspherical.

Table 25 collectively shows values about the aforementioned conditional formulas for each example. Table 25 shows, as various kinds of data, F-number Fno. and focal length f (mm) of the entire system. In the lens data of each example shown in the following tables 1 through 12, mm is used as the unit of length. However, since an optical system can be used by proportionally enlarging or reducing the optical system, other appropriate units may be used.

FIG. 13, Section A through Section C illustrate a spherical aberration, astigmatism (curvature of field) and distortion (distortion aberration) in the imaging lens of Example 1, respectively. Each aberration diagram illustrates an aberration when d-line (wavelength 587.56 nm) is a reference wavelength. The diagram of the spherical aberration and the diagram of the astigmatism also illustrate aberrations for g-line (wavelength 435.83 nm) and C-line (wavelength 656.27 nm). In the diagram of astigmatism, an aberration in sagittal direction (S) is indicated by a solid line, and an aberration in tangential direction (T) is indicated by a broken line. Further, Fno. represents an F-number, and Y represents image height (Y).

Similarly, FIG. 14, Section A through Section C illustrate various aberrations in the imaging lens of Example 2. Similarly, FIG. 15, Section A through Section C through FIG. 24, Section A through Section C illustrate various aberrations for the imaging lenses of Example 3 through Example 12.

As the numerical value data and the aberration diagrams show, each example achieves high image formation performance while reducing the total length.

The present invention is not limited to the aforementioned embodiments nor examples, and various modifications are possible. For example, values of a curvature radius, a distance between surfaces, a refractive index, an Abbe number and an aspherical coefficient of each lens element are not limited to the values in the aforementioned examples of numerical values, but may be other values.

In the description of each of all the examples, use of the imaging lens with fixed focus is assumed. Alternatively, the imaging lens may be structured in such a manner that focus is adjustable. For example, the imaging lens may be structured in such a manner that autofocusing is possible by extending the whole lens system, or by moving, on an optical axis, a part of lenses.

TABLE 1

EXAMPLE 1 • BASIC LENS DATA

| Si | Ri | Di | Ndj | vdj |
|---|---|---|---|---|
| 0 | ∞ | −0.1300 | | |
| 1* | 1.1916 | 0.4262 | 1.533914 | 55.89 |
| 2* | 10.0326 | 0.1287 | | |
| 3* | −2.3603 | 0.3500 | 1.633506 | 23.63 |
| 4* | −42.8398 | 0.0999 | | |
| 5* | 1.9172 | 0.3998 | 1.533914 | 55.89 |
| 6* | 4.5163 | 0.7136 | | |
| 7* | 5.9361 | 0.4999 | 1.533914 | 55.89 |
| 8* | 1.2836 | 0.1000 | | |
| 9* | 1.7604 | 0.3998 | 1.533914 | 55.89 |
| 10* | 1.9466 | 0.4000 | | |
| 11 | ∞ | 0.1000 | 1.516330 | 64.14 |
| 12 | ∞ | 0.7144 | | |

*ASPHERICAL SURFACE

TABLE 2

EXAMPLE 2 • BASIC LENS DATA

| Si | Ri | Di | Ndj | vdj |
|---|---|---|---|---|
| 0 | ∞ | −0.1300 | | |
| 1* | 1.1916 | 0.4262 | 1.533914 | 55.89 |
| 2* | 10.0326 | 0.1287 | | |
| 3* | −2.3603 | 0.3500 | 1.633506 | 23.63 |
| 4* | −42.8398 | 0.0999 | | |
| 5* | 1.9172 | 0.3998 | 1.533914 | 55.89 |
| 6* | 4.5163 | 0.7136 | | |
| 7* | 5.9361 | 0.4999 | 1.533914 | 55.89 |
| 8* | 1.2836 | 0.1000 | | |
| 9* | 1.7604 | 0.3998 | 1.533914 | 55.89 |
| 10* | 1.9466 | 0.4000 | | |
| 11 | ∞ | 0.1000 | 1.516330 | 64.14 |
| 12 | ∞ | 0.7144 | | |

*ASPHERICAL SURFACE

TABLE 3

EXAMPLE 3 • BASIC LENS DATA

| Si | Ri | Di | Ndj | vdj |
|---|---|---|---|---|
| 0 | ∞ | −0.1300 | | |
| 1* | 1.1695 | 0.4492 | 1.533914 | 55.89 |
| 2* | 21.4195 | 0.0999 | | |
| 3* | −2.2911 | 0.3500 | 1.633506 | 23.63 |
| 4* | −52.9388 | 0.1007 | | |
| 5* | 2.1815 | 0.3998 | 1.533914 | 55.89 |
| 6* | 6.4423 | 0.6867 | | |
| 7* | −368.9389 | 0.4999 | 1.533914 | 55.89 |
| 8* | 0.9379 | 0.0999 | | |
| 9* | 1.1692 | 0.4252 | 1.533914 | 55.89 |
| 10* | 2.7879 | 0.4000 | | |
| 11 | ∞ | 0.1000 | 1.516330 | 64.14 |
| 12 | ∞ | 0.7144 | | |

*ASPHERICAL SURFACE

TABLE 4

EXAMPLE 4 • BASIC LENS DATA

| Si | Ri | Di | Ndj | vdj |
|---|---|---|---|---|
| 0 | ∞ | −0.1300 | | |
| 1* | 1.1753 | 0.4477 | 1.533914 | 55.89 |
| 2* | 22.2518 | 0.1000 | | |
| 3* | −2.3194 | 0.3499 | 1.633506 | 23.63 |
| 4* | −72.0018 | 0.1010 | | |
| 5* | 2.1752 | 0.3998 | 1.533914 | 55.89 |

TABLE 4-continued

EXAMPLE 4 • BASIC LENS DATA

| Si | Ri | Di | Ndj | vdj |
|---|---|---|---|---|
| 6* | 6.1941 | 0.6969 | | |
| 7* | 30.7427 | 0.4999 | 1.533914 | 55.89 |
| 8* | 0.9104 | 0.0999 | | |
| 9* | 1.1562 | 0.4147 | 1.533914 | 55.89 |
| 10* | 2.7105 | 0.4000 | | |
| 11 | ∞ | 0.1000 | 1.516330 | 64.14 |
| 12 | ∞ | 0.7144 | | |

*ASPHERICAL SURFACE

TABLE 5

EXAMPLE 5 • BASIC LENS DATA

| Si | Ri | Di | Ndj | vdj |
|---|---|---|---|---|
| 0 | ∞ | −0.1300 | | |
| 1* | 1.2043 | 0.4383 | 1.533914 | 55.89 |
| 2* | −362.1279 | 0.1000 | | |
| 3* | −2.4172 | 0.3499 | 1.633506 | 23.63 |
| 4* | −61.6446 | 0.1217 | | |
| 5* | 2.7580 | 0.3998 | 1.533914 | 55.89 |
| 6* | 6.8268 | 0.6794 | | |
| 7* | 5.2657 | 0.4999 | 1.533914 | 55.89 |
| 8* | 0.9379 | 0.0999 | | |
| 9* | 1.2241 | 0.3998 | 1.533914 | 55.89 |
| 10* | 1.9452 | 0.4000 | | |
| 11 | ∞ | 0.1000 | 1.516330 | 64.14 |
| 12 | ∞ | 0.7144 | | |

*ASPHERICAL SURFACE

TABLE 6

EXAMPLE 6 • BASIC LENS DATA

| Si | Ri | Di | Ndj | vdj |
|---|---|---|---|---|
| 0 | ∞ | −0.1300 | | |
| 1* | 1.1938 | 0.4383 | 1.533914 | 55.89 |
| 2* | −49.9575 | 0.1000 | | |
| 3* | −2.2631 | 0.3499 | 1.633506 | 23.63 |
| 4* | 33.9414 | 0.1217 | | |
| 5* | 2.8588 | 0.4173 | 1.533914 | 55.89 |
| 6* | 14.7368 | 0.6794 | | |
| 7* | 5.0375 | 0.4999 | 1.530000 | 38.81 |
| 8* | 0.9151 | 0.0999 | | |
| 9* | 1.2023 | 0.4101 | 1.533914 | 55.89 |
| 10* | 1.8905 | 0.4000 | | |
| 11 | ∞ | 0.1000 | 1.516330 | 64.14 |
| 12 | ∞ | 0.7144 | | |

*ASPHERICAL SURFACE

TABLE 7

EXAMPLE 7 • BASIC LENS DATA

| Si | Ri | Di | Ndj | vdj |
|---|---|---|---|---|
| 0 | ∞ | −0.1300 | | |
| 1* | 1.1599 | 0.4253 | 1.533914 | 55.89 |
| 2* | 11.5573 | 0.1145 | | |
| 3* | −2.8925 | 0.3500 | 1.633506 | 23.63 |
| 4* | −14.9979 | 0.1048 | | |
| 5* | 3.4794 | 0.3998 | 1.533914 | 55.89 |
| 6* | 6.8365 | 0.6012 | | |
| 7* | 19.6111 | 0.4999 | 1.633506 | 23.63 |
| 8* | 1.3300 | 0.2105 | | |
| 9* | 0.9515 | 0.3998 | 1.533914 | 55.89 |
| 10* | 1.2375 | 0.4000 | | |

TABLE 7-continued

EXAMPLE 7 • BASIC LENS DATA

| Si | Ri | Di | Ndj | vdj |
|---|---|---|---|---|
| 11 | ∞ | 0.1000 | 1.516330 | 64.14 |
| 12 | ∞ | 0.7144 | | |

*ASPHERICAL SURFACE

TABLE 8

EXAMPLE 8 • BASIC LENS DATA

| Si | Ri | Di | Ndj | vdj |
|---|---|---|---|---|
| 0 | ∞ | −0.1300 | | |
| 1* | 1.1697 | 0.4418 | 1.533914 | 55.89 |
| 2* | 14.1588 | 0.0999 | | |
| 3* | −4.2168 | 0.3500 | 1.633506 | 23.63 |
| 4* | 43.4268 | 0.1489 | | |
| 5* | 5.1280 | 0.3998 | 1.533914 | 55.89 |
| 6* | 10.6100 | 0.5533 | | |
| 7* | 20.4465 | 0.5000 | 1.633506 | 23.63 |
| 8* | 1.3336 | 0.1227 | | |
| 9* | 0.9896 | 0.4502 | 1.533914 | 55.89 |
| 10* | 1.2960 | 0.4000 | | |
| 11 | ∞ | 0.1000 | 1.516330 | 64.14 |
| 12 | ∞ | 0.7144 | | |

*ASPHERICAL SURFACE

TABLE 9

EXAMPLE 9 • BASIC LENS DATA

| Si | Ri | Di | Ndj | vdj |
|---|---|---|---|---|
| 0 | ∞ | −0.1300 | | |
| 1* | 1.2024 | 0.4370 | 1.533914 | 55.89 |
| 2* | −288.5212 | 0.0999 | | |
| 3* | −2.4034 | 0.3500 | 1.633506 | 23.63 |
| 4* | −103.5539 | 0.1214 | | |
| 5* | 2.7377 | 0.3998 | 1.533914 | 55.89 |
| 6* | 7.3274 | 0.6843 | | |
| 7* | 4.9502 | 0.4999 | 1.533914 | 55.89 |
| 8* | 0.7929 | 0.0999 | | |
| 9* | 0.9883 | 0.3998 | 1.533914 | 55.89 |
| 10* | 1.8288 | 0.4000 | | |
| 11 | ∞ | 0.1000 | 1.516330 | 64.14 |
| 12 | ∞ | 0.7144 | | |

*ASPHERICAL SURFACE

TABLE 10

EXAMPLE 10 • BASIC LENS DATA

| Si | Ri | Di | Ndj | vdj |
|---|---|---|---|---|
| 0 | ∞ | −0.1300 | | |
| 1* | 1.1992 | 0.4445 | 1.533914 | 55.89 |
| 2* | 186.0192 | 0.1000 | | |
| 3* | −2.4231 | 0.3499 | 1.633506 | 23.63 |
| 4* | −77.7023 | 0.1245 | | |
| 5* | 2.6169 | 0.3998 | 1.533914 | 55.89 |
| 6* | 6.3640 | 0.6762 | | |
| 7* | 5.8574 | 0.4999 | 1.533914 | 55.89 |
| 8* | 0.9552 | 0.0999 | | |
| 9* | 1.2695 | 0.3998 | 1.533914 | 55.89 |
| 10* | 2.0882 | 0.4000 | | |
| 11 | ∞ | 0.1000 | 1.516330 | 64.14 |
| 12 | ∞ | 0.7144 | | |

*ASPHERICAL SURFACE

TABLE 11

EXAMPLE 11 • BASIC LENS DATA

| Si | Ri | Di | Ndj | vdj |
|---|---|---|---|---|
| 0 | ∞ | −0.1300 | | |
| 1* | 1.2079 | 0.4195 | 1.533914 | 55.89 |
| 2* | −205.2238 | 0.1000 | | |
| 3* | −2.5300 | 0.3499 | 1.633506 | 23.63 |
| 4* | 146.5792 | 0.1291 | | |
| 5* | 2.9486 | 0.3998 | 1.533914 | 55.89 |
| 6* | 9.1632 | 0.6884 | | |
| 7* | 6.0401 | 0.4999 | 1.533914 | 55.89 |
| 8* | 0.9589 | 0.0999 | | |
| 9* | 1.0794 | 0.3998 | 1.533914 | 55.89 |
| 10* | 1.5411 | 0.4000 | | |
| 11 | ∞ | 0.1000 | 1.516330 | 64.14 |
| 12 | ∞ | 0.7144 | | |

*ASPHERICAL SURFACE

TABLE 12

EXAMPLE 12 • BASIC LENS DATA

| Si | Ri | Di | Ndj | vdj |
|---|---|---|---|---|
| 0 | ∞ | −0.1300 | | |
| 1* | 1.2092 | 0.4154 | 1.533914 | 55.89 |
| 2* | −56.5328 | 0.1000 | | |
| 3* | −2.4297 | 0.3499 | 1.633506 | 23.63 |
| 4* | 271.5875 | 0.1238 | | |
| 5* | 2.8489 | 0.3998 | 1.533914 | 55.89 |
| 6* | 8.4654 | 0.6943 | | |
| 7* | 8.4586 | 0.4999 | 1.533914 | 55.89 |
| 8* | 1.0131 | 0.0999 | | |
| 9* | 0.9919 | 0.3998 | 1.533914 | 55.89 |
| 10* | 1.3288 | 0.4000 | | |
| 11 | ∞ | 0.1000 | 1.516330 | 64.14 |
| 12 | ∞ | 0.7144 | | |

*ASPHERICAL SURFACE

TABLE 13

EXAMPLE 1 • ASPHERICAL SURFACE DATA

| SURFACE NUMBER | K | A3 | A4 | A5 | A6 |
|---|---|---|---|---|---|
| 1 | −1.436459E+01 | −1.742944E−01 | 2.375746E+00 | −3.137401E+00 | −1.484031E+01 |
| 2 | −5.862706E+01 | −1.235195E−01 | 4.766374E−01 | 1.657003E−01 | −1.394453E+01 |
| 3 | −9.565387E+01 | 1.675156E−01 | −2.014356E+00 | 2.734886E+00 | 1.368710E+01 |
| 4 | 6.802959E+00 | 7.138747E−02 | −9.746571E−01 | 1.319744E+00 | 6.000803E+00 |
| 5 | −1.000000E+02 | −1.450761E−02 | 1.182768E+00 | −5.184698E+00 | 5.320197E+00 |
| 6 | −2.124903E+00 | 2.353303E−02 | −4.332807E−01 | −2.298966E−02 | 4.034793E+00 |
| 7 | −9.955140E+01 | −2.327602E−01 | 8.571060E−01 | −3.708430E+00 | 3.489211E+00 |
| 8 | −1.114650E+01 | −7.535719E−01 | 4.389932E−01 | 7.222134E−02 | −6.278086E−01 |
| 9 | −3.443509E+01 | −5.508807E−01 | −9.482170E−01 | 1.276275E+00 | 1.111641E+00 |
| 10 | −3.360501E+00 | −1.611343E−01 | −1.031611E+00 | 1.725343E+00 | −5.492365E−01 |

| | A7 | A8 | A9 | A10 | A11 |
|---|---|---|---|---|---|
| 1 | 7.412212E+01 | −1.210760E+02 | 2.786421E+01 | 8.802861E+01 | 3.089445E+00 |
| 2 | 5.729906E+01 | −9.045202E+01 | 1.272073E+01 | 1.016182E+02 | −3.406681E+01 |
| 3 | −4.149934E+01 | −6.684536E+01 | 6.141178E+02 | −1.584343E+03 | 2.076281E+03 |
| 4 | −1.870282E+01 | 1.645361E+01 | 4.401971E+00 | 1.015102E+01 | −6.477797E+01 |
| 5 | 1.074348E+01 | −3.842348E+01 | 5.910951E+01 | −6.358512E+01 | 6.204387E+01 |
| 6 | 1.613984E+00 | −4.487961E+00 | −1.245958E+00 | 1.303564E+01 | −8.387129E+00 |
| 7 | 9.171945E+00 | −2.068029E+01 | −7.003720E+00 | 4.248842E+01 | −2.221943E+01 |
| 8 | 8.646616E−01 | −1.761564E−01 | −2.109263E+00 | 4.143717E+00 | −3.285049E+00 |
| 9 | −1.540432E+00 | −9.537622E−02 | 3.806414E−01 | 1.710542E−01 | −1.145447E−01 |
| 10 | −1.197511E−02 | −9.577544E−01 | 1.251834E+00 | −5.077458E−01 | 6.089544E−03 |

| | A12 | A13 | A14 | A15 | A16 |
|---|---|---|---|---|---|
| 1 | 1.538738E+02 | −7.387355E+02 | 5.227366E+02 | 3.886375E+02 | −4.019144E+02 |
| 2 | −5.700989E+01 | −5.119646E+01 | −1.021273E+01 | 2.546035E+02 | −1.772008E+02 |
| 3 | −9.710206E+02 | −1.305335E+03 | 2.635299E+03 | −1.890515E+03 | 5.197787E+02 |
| 4 | 5.195051E+01 | 5.179783E+00 | 4.296229E+01 | −1.006696E+02 | 4.656333E+01 |
| 5 | −1.063402E+02 | 2.003205E+02 | −2.091364E+02 | 1.012719E+02 | −1.724510E+01 |
| 6 | −8.278668E+00 | 6.826757E+00 | 4.176736E+00 | −3.194596E+00 | −8.635598E−02 |
| 7 | 1.631630E−01 | −2.965275E+01 | 3.865015E+01 | −1.038228E+01 | −1.564753E+00 |
| 8 | 8.914058E−01 | 3.747649E−01 | −3.660854E−01 | 1.109534E−01 | −1.258762E−02 |
| 9 | −1.074698E−01 | 8.710937E−02 | −1.647467E−02 | −1.358908E−03 | 5.198454E−04 |
| 10 | 2.743957E−02 | 7.206732E−03 | −3.529036E−03 | −5.586527E−04 | 2.250793E−04 |

TABLE 14

EXAMPLE 2 • ASPHERICAL SURFACE DATA

| SURFACE NUMBER | K | A3 | A4 | A5 | A6 |
|---|---|---|---|---|---|
| 1 | −1.436459E+01 | −1.731686E−01 | 2.358022E+00 | −3.215015E+00 | −1.115696E+01 |
| 2 | −5.862706E+01 | −1.227599E−01 | 4.519369E−01 | 4.989646E−01 | −1.642291E+01 |
| 3 | −9.565387E+01 | 1.757387E−01 | −2.262928E+00 | 5.719467E+00 | −4.380736E+00 |
| 4 | 6.802959E+00 | 7.105330E−02 | −9.630667E−01 | 1.148694E+00 | 7.427571E+00 |
| 5 | −1.000000E+02 | −1.529291E−02 | 1.206821E+00 | −5.483558E+00 | 7.300908E+00 |

TABLE 14-continued

EXAMPLE 2 • ASPHERICAL SURFACE DATA

|   |   |   |   |   |   |
|---|---|---|---|---|---|
| 6 | −2.124903E+00 | 2.361114E−02 | −4.365448E−01 | 2.654157E−02 | 1.446769E−02 |
| 7 | −9.955140E+01 | −2.350179E−01 | 9.054597E−01 | −4.136344E+00 | 5.545209E+00 |
| 8 | −1.114650E+01 | −7.590350E−01 | 5.121546E−01 | −3.160482E−01 | 3.998580E−01 |
| 9 | −3.443509E+01 | −5.562536E−01 | −8.926710E−01 | 1.050054E+00 | 1.566389E+00 |
| 10 | −3.360501E+00 | −1.464563E−01 | −1.176997E+00 | 2.305647E+00 | −1.753734E+00 |

|   | A7 | A8 | A9 | A10 | A11 |
|---|---|---|---|---|---|
| 1 | 3.741470E+01 | 7.415881E+01 | −6.142524E+02 | 1.448192E+03 | −1.824647E+03 |
| 2 | 6.857304E+01 | −1.229696E+02 | 7.110490E+01 | 4.402675E+01 | −2.197048E+01 |
| 3 | 1.143307E+01 | −8.048810E+01 | 1.817884E+02 | −9.855591E+01 | −8.937411E+01 |
| 4 | −2.619201E+01 | 4.232156E+01 | −5.456735E+01 | 9.400306E+01 | −1.210363E+02 |
| 5 | 3.131104E+00 | −2.171718E+01 | 4.207471E+01 | −6.651843E+01 | 7.466284E+01 |
| 6 | 3.425488E+00 | −9.788116E+00 | 8.591601E+00 | 2.004400E+00 | −2.367827E+00 |
| 7 | 3.363680E+00 | −1.141162E+01 | −1.211174E+01 | 3.178758E+01 | 6.285887E+00 |
| 8 | −3.824365E−01 | −4.019022E−01 | 8.741180E−01 | −2.740250E−01 | −1.500668E−01 |
| 9 | −1.950431E+00 | −1.599993E−01 | 8.868895E−01 | −2.525174E−01 | −8.969779E−02 |
| 10 | 1.324096E+00 | −1.531274E+00 | 8.633082E−01 | 1.638430E−01 | −3.536488E−01 |

|   | A12 | A13 | A14 | A15 | A16 |
|---|---|---|---|---|---|
| 1 | 1.564971E+03 | −1.111472E+03 | 2.332044E+02 | 6.447905E+02 | −4.590710E+02 |
| 2 | −2.248909E+01 | −7.845718E+01 | −1.984913E+01 | 2.741127E+02 | −1.838148E+02 |
| 3 | −2.976710E+02 | 1.239871E+03 | −1.490976E+03 | 7.636995E+02 | −1.390473E+02 |
| 4 | 2.214027E+01 | 1.093743E+02 | −5.789364E+01 | −5.339557E+01 | 3.749131E+01 |
| 5 | −6.282445E+01 | 6.313906E+01 | −5.055074E+01 | 1.332267E+01 | 2.337923E+01 |
| 6 | −7.707198E+00 | 4.556142E+00 | 4.418508E+00 | −2.442234E+00 | −3.756729E−01 |
| 7 | −3.292870E+01 | −6.794873E+00 | 2.893004E+01 | −7.992511E+00 | −1.831478E+00 |
| 8 | 8.566944E−03 | 1.012413E−01 | −5.955478E−02 | 1.492651E−02 | −1.601032E−03 |
| 9 | 9.261207E−02 | −7.533916E−02 | 4.546356E−02 | −1.352466E−02 | 1.512565E−03 |
| 10 | 7.333294E−02 | 4.932326E−02 | −2.716831E−02 | 4.507518E−03 | −1.900665E−04 |

TABLE 15

EXAMPLE 3 • ASPHERICAL SURFACE DATA

| SURFACE NUMBER | K | A3 | A4 | A5 | A6 |
|---|---|---|---|---|---|
| 1 | −1.436447E+01 | −1.315270E−01 | 2.285851E+00 | −4.106738E+00 | −2.798496E+00 |
| 2 | −5.862706E+01 | −4.802376E−02 | 7.282633E−02 | −3.638545E−01 | −5.087103E+00 |
| 3 | −9.565287E+01 | 9.566805E−02 | −1.882584E+00 | 3.615102E+00 | 5.027546E+00 |
| 4 | 6.802951E+00 | 1.593638E−02 | −6.590977E−01 | 8.676877E−01 | 3.125693E+00 |
| 5 | −1.000000E+02 | −1.813420E−02 | 6.527152E−01 | −4.330711E+00 | 1.031798E+01 |
| 6 | −2.124792E+00 | −1.392660E−03 | −2.330786E−01 | −9.964732E−01 | 3.965864E+00 |
| 7 | −9.955140E+01 | −2.576782E−01 | 3.549791E+00 | −4.249244E+01 | 2.415782E+02 |
| 8 | −1.115105E+01 | −5.300060E−01 | −1.329349E−02 | 2.443570E−01 | 3.920565E−01 |
| 9 | −3.442863E+01 | −3.480990E−02 | −1.029706E+00 | 3.043679E−01 | 1.345378E+00 |
| 10 | −3.350689E+00 | 8.867505E−02 | −1.347263E+00 | 2.204982E+00 | −1.819726E+00 |

|   | A7 | A8 | A9 | A10 | A11 |
|---|---|---|---|---|---|
| 1 | 1.418761E+01 | 4.522155E+01 | −2.365892E+02 | 2.723618E+02 | 1.486213E+02 |
| 2 | 3.421854E+01 | −9.059042E+01 | 1.235046E+02 | −9.584214E+01 | −7.502028E+01 |
| 3 | −2.423555E+01 | 2.309367E+01 | 4.935846E+00 | 1.048989E+01 | −4.428419E+01 |
| 4 | −4.950269E+00 | −1.211629E+00 | 4.111547E+00 | −1.504428E−01 | 1.005233E+01 |
| 5 | −1.154967E+00 | 1.736588E+00 | 1.431842E+01 | −1.334381E+01 | −5.631732E+00 |
| 6 | −9.577997E+00 | 1.594152E+01 | 8.785592E+00 | −1.223280E+02 | 2.791393E+02 |
| 7 | −8.370678E+02 | 1.820840E+03 | −2.329429E+03 | 1.140105E+03 | 1.269588E+03 |
| 8 | −1.949682E+00 | 1.889897E+00 | 6.173665E−01 | −3.713736E−01 | −6.126899E−01 |
| 9 | −3.580015E−01 | −1.186126E−01 | 6.637075E−01 | 2.324728E−01 | −2.119073E−01 |
| 10 | 1.726757E+00 | −1.768269E+00 | 5.367839E−01 | 8.260570E−01 | −8.747282E−01 |

|   | A12 | A13 | A14 | A15 | A16 |
|---|---|---|---|---|---|
| 1 | −2.951870E+02 | −5.017329E+02 | 9.617297E+02 | −3.264623E+02 | −9.070377E+01 |
| 2 | 7.043104E+02 | −1.643416E+03 | 1.784396E+03 | −8.792943E+02 | 1.387725E+02 |
| 3 | −6.288409E+01 | 2.181675E+02 | −1.641527E+02 | 1.515501E+01 | 1.673175E+01 |
| 4 | −1.659592E+01 | −5.248310E+00 | 2.369100E+01 | −1.623323E+01 | 2.957348E+00 |
| 5 | −1.830514E+01 | 7.889286E+01 | −6.012395E+01 | −8.206386E+00 | 1.571963E+01 |
| 6 | −2.987356E+02 | 1.464879E+02 | −1.497468E+01 | −7.247687E+00 | −2.001708E−01 |
| 7 | −2.507498E+03 | 1.569626E+03 | −1.897059E+02 | −2.131013E+02 | 7.334977E+01 |
| 8 | 4.782597E−01 | 9.366505E−02 | −1.152005E−01 | 3.141877E−04 | 7.593481E−03 |

TABLE 15-continued

EXAMPLE 3 • ASPHERICAL SURFACE DATA

| | | | | | |
|---|---|---|---|---|---|
| 9 | −7.833306E−03 | 1.765755E−02 | 1.046314E−02 | −6.747899E−03 | 9.602326E−04 |
| 10 | 2.818861E−01 | 1.875721E−02 | −3.392796E−02 | 7.613571E−03 | −5.126563E−04 |

TABLE 16

EXAMPLE 4 • ASPHERICAL SURFACE DATA

| SURFACE NUMBER | K | A3 | A4 | A5 | A6 |
|---|---|---|---|---|---|
| 1 | −1.436427E+01 | −1.305566E−01 | 2.259692E+00 | −3.869336E+00 | −5.539424E+00 |
| 2 | −5.862706E+01 | −8.111611E−02 | 1.118674E+00 | −1.389138E+01 | 8.981746E+01 |
| 3 | −9.565288E+01 | 1.005040E−01 | −1.844082E+00 | 3.513826E+00 | 5.968492E+00 |
| 4 | 6.802951E+00 | 1.099639E−02 | −6.990667E−01 | 1.530520E+00 | 1.787896E−01 |
| 5 | −1.000000E+02 | −3.018269E−02 | 6.937173E−01 | −3.919811E+00 | 7.528534E+00 |
| 6 | −2.121427E+00 | 1.471759E−02 | −3.676316E−01 | −4.915555E−02 | −9.031315E−01 |
| 7 | −9.955140E+01 | −1.143146E−01 | 1.240267E−01 | −6.559954E+00 | 3.136872E+01 |
| 8 | −1.115105E+01 | −5.235020E−01 | −4.640422E−02 | 1.425161E−01 | 7.800811E−01 |
| 9 | −3.442607E+01 | −8.243404E−02 | −1.072765E+00 | 4.069279E−01 | 1.423043E+00 |
| 10 | −3.350813E+00 | 3.844524E−03 | −1.052224E+00 | 1.146643E+00 | 9.371776E−01 |

| | A7 | A8 | A9 | A10 | A11 |
|---|---|---|---|---|---|
| 1 | 3.063293E+01 | −8.180389E+00 | −1.427882E+02 | 2.126742E+02 | 7.328874E+01 |
| 2 | −3.427706E+02 | 6.895665E+02 | −1.950859E+02 | −2.249544E+03 | 4.084518E+03 |
| 3 | −2.673368E+01 | −3.936681E+00 | 2.328910E+02 | −7.824525E+02 | 1.493587E+03 |
| 4 | 4.532803E+00 | −2.509005E+01 | 2.957493E+01 | 4.764064E+01 | −1.711629E+02 |
| 5 | −2.178412E+00 | −1.934111E+01 | 4.421978E+01 | −3.035166E+01 | −2.186849E+01 |
| 6 | 6.572823E+00 | −1.286486E+01 | 1.840248E+01 | −5.249541E+01 | 1.217249E+02 |
| 7 | −8.740380E+01 | 1.521149E+02 | −1.315753E+02 | −7.864053E+01 | 3.556473E+02 |
| 8 | −2.566515E+00 | 2.412032E+00 | −1.211501E−01 | −4.786535E−01 | −3.041592E−01 |
| 9 | −5.826455E−01 | −9.982354E−01 | 5.874552E−01 | 1.693019E−01 | −6.032846E−02 |
| 10 | −2.315854E+00 | 1.251537E+00 | 7.252635E−02 | −2.689688E−01 | 5.257310E−02 |

| | A12 | A13 | A14 | A15 | A16 |
|---|---|---|---|---|---|
| 1 | −1.772456E+02 | −3.647417E+02 | 5.177154E+02 | 6.546122E+01 | −2.132000E+02 |
| 2 | 1.165498E+03 | −1.278756E+04 | 1.816724E+04 | −1.139714E+04 | 2.786556E+03 |
| 3 | −1.751806E+03 | 1.040742E+03 | 5.629363E+01 | −4.386803E+02 | 1.724976E+02 |
| 4 | 1.661509E+02 | 2.215661E+01 | −1.699367E+02 | 1.277360E+02 | −3.288879E+00 |
| 5 | 7.465394E+00 | 8.755557E+01 | −9.789499E+01 | 1.966413E+01 | 8.579835E+00 |
| 6 | −1.461356E+02 | 8.914495E+01 | −3.354635E+01 | 1.714179E+01 | −6.609464E+00 |
| 7 | −3.683010E+02 | 8.939383E+01 | 1.146128E+02 | −9.190485E+01 | 2.030309E+01 |
| 8 | 2.964309E−02 | 4.804832E−01 | −2.976230E−01 | 4.156107E−02 | 4.460410E−03 |
| 9 | −1.326390E−01 | 7.022032E−02 | −6.776007E−04 | −5.885038E−03 | 9.846700E−04 |
| 10 | 3.577450E−02 | −3.880283E−02 | 2.276279E−02 | −7.093172E−03 | 8.658592E−04 |

TABLE 17

EXAMPLE 5 • ASPHERICAL SURFACE DATA

| SURFACE NUMBER | K | A3 | A4 | A5 | A6 |
|---|---|---|---|---|---|
| 1 | −1.436387E+01 | −1.431379E−01 | 2.181283E+00 | −3.134828E+00 | −1.183136E+01 |
| 2 | −5.862706E+01 | −6.676352E−02 | 2.855559E−01 | −9.316515E−01 | −4.025538E+00 |
| 3 | −9.565231E+01 | 1.866110E−01 | −2.159879E+00 | 4.360765E+00 | 4.754550E+00 |
| 4 | 6.802951E+00 | 5.089565E−02 | −5.641846E−01 | 1.019580E+00 | 2.208244E+00 |
| 5 | −1.000000E+02 | −6.015433E−02 | 2.023028E−01 | 1.025777E+00 | −2.231635E+01 |
| 6 | −2.121441E+00 | 1.605217E−02 | −3.773076E−01 | −1.605296E−01 | 8.545475E−01 |
| 7 | −9.955140E+01 | −1.633596E−01 | 2.859654E−01 | −2.401622E+00 | 2.809302E+00 |
| 8 | −1.117915E+01 | −4.706311E−01 | 2.574317E−01 | −5.322338E−01 | 7.023893E−01 |
| 9 | −3.441650E+01 | 1.181103E−02 | −1.265861E+00 | −4.566393E−01 | 3.701953E+00 |
| 10 | −3.350570E+00 | 7.911942E−02 | −1.487580E+00 | 1.323220E+00 | 1.552784E+00 |

| | A7 | A8 | A9 | A10 | A11 |
|---|---|---|---|---|---|
| 1 | 6.655814E+01 | −1.404484E+02 | 1.787941E+02 | −2.740186E+02 | 3.041017E+02 |
| 2 | 2.631117E+01 | −4.279578E+01 | −1.739833E+01 | 8.188639E+01 | 5.417156E+01 |
| 3 | −2.560067E+01 | 1.344066E+01 | 4.198485E+01 | −5.716425E+00 | −1.026530E+02 |
| 4 | −6.318067E+00 | 4.520063E+00 | 2.994437E+00 | −2.962509E+00 | −7.539691E+00 |
| 5 | 1.138186E+02 | −2.808933E+02 | 2.701973E+02 | 3.657568E+02 | −1.436068E+03 |
| 6 | −1.771720E+00 | 7.585217E+00 | −1.609861E+01 | 2.600485E+00 | 3.581661E+01 |

TABLE 17-continued

EXAMPLE 5 • ASPHERICAL SURFACE DATA

|   | | | | | |
|---|---|---|---|---|---|
| 7  | 6.791903E+00  | −2.344662E+01 | 2.233047E+01  | −1.140851E+01 | 2.129923E+01  |
| 8  | −1.648062E+00 | 2.850588E+00  | −2.364646E+00 | 1.020612E+00  | −6.390493E−01 |
| 9  | −2.713858E+00 | 2.294602E−01  | −1.714414E−01 | 5.816880E−01  | −2.255137E−01 |
| 10 | −2.942521E+00 | 1.380548E+00  | −1.262518E−02 | −4.775333E−02 | −6.061421E−02 |

|   | A12 | A13 | A14 | A15 | A16 |
|---|---|---|---|---|---|
| 1  | 6.868786E+02  | −2.680284E+03 | 3.178536E+03  | −1.453945E+03 | 1.316676E+02  |
| 2  | −1.895847E+02 | −3.397825E+01 | 2.147744E+02  | −2.783435E+01 | −6.626603E+01 |
| 3  | −8.094709E+01 | 4.822607E+02  | −4.817941E+02 | 1.439982E+02  | 7.887787E+00  |
| 4  | 6.986635E+00  | 1.522812E+01  | −2.023425E+01 | −6.108610E−01 | 5.135883E+00  |
| 5  | 1.755206E+03  | −8.000804E+02 | −2.167209E+02 | 3.405287E+02  | −9.049537E+01 |
| 6  | −4.304036E+01 | 3.912932E+00  | 1.642474E+01  | −3.756232E+00 | −1.999222E+00 |
| 7  | −2.486716E+01 | −4.873629E+00 | 2.055179E+01  | −7.657335E+00 | −1.544427E−01 |
| 8  | 7.446534E−01  | −4.810698E−01 | 1.575336E−01  | −3.337434E−02 | 5.040902E−03  |
| 9  | 4.903667E−02  | −1.278817E−01 | 1.049249E−01  | −3.267115E−02 | 3.630711E−03  |
| 10 | 1.666021E−03  | 1.385286E−02  | 2.314263E−03  | −3.542479E−03 | 6.272792E−04  |

TABLE 18

EXAMPLE 6 • ASPHERICAL SURFACE DATA

| SURFACE NUMBER | K | A3 | A4 | A5 | A6 |
|---|---|---|---|---|---|
| 1  | −1.436364E+01 | −2.465549E−01 | 4.518494E+00  | −2.494014E+01 | 6.573909E+01  |
| 2  | −5.862706E+01 | −1.093454E−01 | 2.880551E−01  | −1.033831E+00 | −1.154803E+00 |
| 3  | −9.565224E+01 | 1.545711E−01  | −2.328498E+00 | 2.719506E+00  | 1.880978E+01  |
| 4  | 6.802951E+00  | 3.794008E−02  | −6.537435E−01 | 7.821801E−02  | 9.060856E+00  |
| 5  | −1.000000E+02 | −7.600864E−02 | 4.203055E−01  | −3.995954E+00 | 1.097751E+01  |
| 6  | −2.121456E+00 | 8.791795E−03  | −4.293700E−01 | 3.422301E−01  | −2.265731E+00 |
| 7  | −9.955140E+01 | −1.643057E−01 | 2.190063E+00  | −2.191644E+00 | 3.070719E+00  |
| 8  | −1.117999E+01 | −3.621806E−01 | 1.848603E−01  | −4.525410E−01 | 9.170343E−02  |
| 9  | −3.441627E+01 | 7.358342E−03  | −1.031968E+00 | −3.615432E−02 | 1.745557E+00  |
| 10 | −3.351290E+00 | −8.389041E−02 | −9.220507E−01 | 1.053574E+00  | 2.592836E−01  |

|   | A7 | A8 | A9 | A10 | A11 |
|---|---|---|---|---|---|
| 1  | 2.915458E+02  | −3.530001E+03 | 1.527055E+04  | −3.598722E+04 | 4.391455E+04  |
| 2  | 7.826817E+00  | 1.535957E+01  | −1.309945E+02 | 2.596543E+02  | −1.906834E+02 |
| 3  | −7.150975E+01 | 8.183843E+01  | 8.157260E+01  | −4.006137E+02 | 6.533282E+02  |
| 4  | −3.092614E+01 | 6.593876E+01  | −8.843603E+01 | 5.487128E+02  | −1.321666E+01 |
| 5  | −1.078898E+01 | −8.222623E+00 | 3.255882E+01  | −1.713410E+01 | −2.627058E+01 |
| 6  | 9.217024E+00  | −1.323308E+01 | −2.018529E+00 | 2.750405E+01  | −3.127615E+01 |
| 7  | 1.899029E+00  | −5.201129E+00 | −1.280504E+01 | 3.050111E+01  | −7.591167E+00 |
| 8  | 4.924981E−01  | −7.364388E−01 | 9.618025E−01  | −1.106511E+00 | 6.411211E−01  |
| 9  | −7.181677E−01 | −6.381234E−01 | 2.733186E−01  | 1.674303E−01  | −2.187469E−02 |
| 10 | −8.211880E−01 | 2.366505E−01  | 8.865888E−02  | 1.029488E−02  | −4.780210E−02 |

|   | A12 | A13 | A14 | A15 | A16 |
|---|---|---|---|---|---|
| 1  | −7.102739E+03 | −5.924291E+04 | 8.750159E+04  | −5.431214E+04 | 1.315129E+04  |
| 2  | 6.983896E+01  | −2.415256E+02 | 3.679241E+02  | −1.239724E+02 | −3.676296E+01 |
| 3  | −5.788497E+02 | 3.511107E+01  | 5.825698E+02  | −5.912281E+02 | 1.881402E+02  |
| 4  | 1.094969E+02  | −3.299196E+02 | 4.249637E+02  | −2.708199E+02 | 6.939563E+01  |
| 5  | −1.352425E+01 | 1.177546E+02  | −1.066045E+02 | 1.347545E+01  | 1.151753E+01  |
| 6  | 1.481214E+01  | 9.576361E−01  | −1.630911E+01 | 2.042270E+01  | −7.762393E+00 |
| 7  | −2.818602E+01 | 2.937473E+01  | −1.423410E+01 | 6.500149E+00  | −1.988468E+00 |
| 8  | 4.072528E−03  | −1.258509E−01 | 4.182543E−03  | 2.007294E−02  | −3.857535E−03 |
| 9  | −4.898634E−02 | −1.962145E−02 | 3.350212E−02  | −1.165323E−02 | 1.344595E−03  |
| 10 | 8.976945E−03  | 3.218262E−03  | −1.996633E−04 | −4.360549E−04 | 7.667060E−05  |

TABLE 19

EXAMPLE 7 • ASPHERICAL SURFACE DATA

| SURFACE NUMBER | K | A3 | A4 | A5 | A6 |
|---|---|---|---|---|---|
| 1 | −1.429131E+01 | −2.010249E−01 | 2.859390E+00  | −5.209293E+00 | −1.070515E+01 |
| 2 | −7.338978E+01 | −7.596662E−02 | 4.761456E−01  | −1.729397E+00 | −2.111219E+00 |
| 3 | −9.140735E+01 | 2.191405E−01  | −1.852364E+00 | 3.504125E+00  | 4.655820E+00  |
| 4 | 1.337596E+01  | 3.213975E−02  | −4.236793E−01 | 4.695608E−01  | 6.365888E−01  |

TABLE 19-continued

EXAMPLE 7 • ASPHERICAL SURFACE DATA

|   | K | A3 | A4 | A5 | A6 |
|---|---|---|---|---|---|
| 5 | −9.999939E+01 | −7.984034E−02 | 3.900477E−01 | −4.525381E+00 | 1.419722E+01 |
| 6 | −9.982479E+01 | 6.157097E−02 | −6.837481E−01 | 6.529516E−01 | −1.676528E−01 |
| 7 | −7.386077E+01 | −1.403540E−01 | −2.364643E−02 | −2.466230E+00 | 5.179346E+00 |
| 8 | −1.430410E+01 | −1.638214E−01 | −7.674030E−01 | 6.806176E−01 | 1.149963E+00 |
| 9 | −1.557102E+01 | 3.923576E−01 | −7.973467E−01 | −1.338065E+00 | 1.973285E+00 |
| 10 | −3.456033E+00 | 2.704724E−01 | −1.351114E+00 | 8.324029E−01 | 5.669763E−01 |

|   | A7 | A8 | A9 | A10 | A11 |
|---|---|---|---|---|---|
| 1 | 6.436911E+01 | −6.838757E+01 | −1.219076E+02 | 1.989858E+02 | 2.671915E+02 |
| 2 | 2.083717E+01 | −1.831907E+01 | −9.154671E+01 | 1.873749E+02 | 8.407868E+00 |
| 3 | −2.350062E+01 | 1.070769E+01 | 5.381063E+01 | −5.098569E+01 | −5.415085E+01 |
| 4 | 5.679785E+00 | −1.710888E+01 | 5.083790E+00 | 2.565060E+01 | −2.396102E+01 |
| 5 | −1.573323E+01 | −2.636404E+01 | 1.427098E+02 | −2.940955E+02 | 3.407008E+02 |
| 6 | 1.338091E+00 | −5.326656E+00 | 3.971905E+00 | 4.772880E+00 | 2.772194E+00 |
| 7 | −1.956451E+00 | −1.809132E+00 | −1.541947E+01 | 3.351944E+01 | −1.008848E+01 |
| 8 | −2.775941E+00 | 8.933919E−01 | 2.314921E+00 | −2.031597E+00 | −3.434673E−01 |
| 9 | 3.614574E−01 | −1.101139E+00 | 9.046331E−02 | 2.782098E−02 | 3.364308E−01 |
| 10 | −6.082867E−01 | −8.591273E−02 | 2.157871E−01 | −4.138777E−02 | 6.788752E−04 |

|   | A12 | A13 | A14 | A15 | A16 |
|---|---|---|---|---|---|
| 1 | −3.900150E+02 | −5.307924E+02 | 7.401124E+02 | 2.205278E+02 | −3.863431E+02 |
| 2 | −1.794204E+02 | −1.612204E+02 | 4.032003E+02 | −9.936349E+01 | −7.296335E+01 |
| 3 | 3.636535E+01 | 9.434085E+01 | −5.445885E+01 | −5.608746E+01 | 3.706316E+01 |
| 4 | 2.612783E+01 | −5.226694E+01 | 1.600591E+01 | 4.020208E+01 | −2.693246E+01 |
| 5 | −1.726002E+02 | −1.022431E+02 | 2.649830E+02 | −2.163759E+02 | 6.931740E+01 |
| 6 | −3.074511E+01 | 4.108040E+01 | −2.483170E+01 | 9.791526E+00 | −2.658077E+00 |
| 7 | −1.749397E+01 | −3.995847E+00 | 2.614531E+01 | −1.428510E+01 | 1.834485E+00 |
| 8 | 8.424523E−01 | −1.300711E−01 | −1.118615E−02 | −7.148824E−02 | 2.741689E−02 |
| 9 | −2.248139E−01 | −4.653631E−03 | 4.633575E−02 | −1.569757E−02 | 1.697959E−03 |
| 10 | −1.897614E−02 | 1.193255E−02 | −1.944640E−03 | −1.846530E−04 | 5.772388E−05 |

TABLE 20

EXAMPLE 8 • ASPHERICAL SURFACE DATA

| SURFACE NUMBER | K | A3 | A4 | A5 | A6 |
|---|---|---|---|---|---|
| 1 | −1.429298E+01 | −1.691171E−01 | 2.511506E+00 | −3.555549E+00 | −1.681275E+01 |
| 2 | −7.338975E+01 | −9.817065E−02 | 4.993268E−01 | −1.326233E+00 | −6.446679E+00 |
| 3 | −9.140753E+01 | 1.557326E−01 | −1.316728E+00 | 3.352201E+00 | −2.531643E+00 |
| 4 | 1.337596E+01 | 3.169476E−02 | −3.202359E−01 | 3.845925E−01 | 3.745745E−01 |
| 5 | −9.999943E+01 | −3.729098E−02 | 2.093771E−02 | −2.951615E+00 | 1.016378E+01 |
| 6 | −9.982478E+01 | 6.382030E−02 | −6.897413E−01 | 7.305159E−01 | 1.197027E−01 |
| 7 | −7.386119E+01 | −1.464893E−01 | 9.031079E−03 | −1.122002E+00 | 2.361511E+00 |
| 8 | −1.431328E+01 | −5.168957E−01 | −1.065433E−01 | 1.044626E+00 | −4.974989E−01 |
| 9 | −1.552642E+01 | −1.606535E−01 | −8.684307E−01 | 1.444579E+00 | −3.716448E+00 |
| 10 | −3.444538E+00 | 3.577416E−03 | −1.104742E+00 | 1.310844E+00 | −6.704980E−02 |

|   | A7 | A8 | A9 | A10 | A11 |
|---|---|---|---|---|---|
| 1 | 8.742735E+01 | −1.326004E+02 | −5.247392E+01 | 3.378927E+02 | −2.929798E+02 |
| 2 | 3.718106E+01 | −4.948886E+01 | −6.891850E+01 | 2.271706E+02 | −1.174084E+02 |
| 3 | −1.171311E+00 | −1.023201E+01 | 3.438297E+01 | 1.027583E+01 | −1.223755E+02 |
| 4 | 2.793346E+00 | −5.462055E+00 | −8.603456E+00 | 2.180813E+01 | 1.387956E+01 |
| 5 | −8.248252E+00 | −3.532242E+01 | 1.027535E+02 | −6.809635E+01 | −7.499386E+01 |
| 6 | −5.774987E−01 | −3.862048E+00 | 8.716055E+00 | −1.008508E+00 | −8.204278E+00 |
| 7 | −9.969995E−01 | −5.399630E+00 | 6.113081E+00 | 4.374705E+00 | −9.936204E+00 |
| 8 | −1.977479E+00 | 1.716226E+00 | 1.914953E+00 | −2.286005E+00 | −1.033721E+00 |
| 9 | 8.353244E+00 | −9.557900E+00 | 5.215779E+00 | −2.560806E−01 | −1.673113E+00 |
| 10 | −6.497987E−01 | 1.140978E−01 | 3.457807E−01 | −1.781496E−01 | −2.753342E−02 |

|   | A12 | A13 | A14 | A15 | A16 |
|---|---|---|---|---|---|
| 1 | 3.835202E+02 | −1.089109E+03 | 1.031921E+03 | 4.884980E+01 | −3.244603E+02 |
| 2 | −7.999527E+01 | −4.773473E+01 | 1.080452E+02 | 1.234629E+02 | −1.311778E+02 |
| 3 | 1.095659E+02 | 5.169760E+01 | −1.265922E+02 | 6.987249E+01 | −1.565488E+01 |
| 4 | −4.375306E+01 | 8.487431E+00 | −4.663022E+00 | 4.778534E+01 | −3.413676E+01 |
| 5 | 5.728066E+01 | 1.644798E+02 | −2.143605E+02 | 5.606476E+01 | 1.343935E+01 |
| 6 | −3.757106E−01 | 9.088390E+00 | −2.552009E+00 | −2.166376E+00 | 6.918403E−01 |
| 7 | 6.932777E+00 | −1.270705E+01 | 1.610731E+01 | −7.333895E+00 | 8.757862E−01 |

TABLE 20-continued

| EXAMPLE 8 • ASPHERICAL SURFACE DATA | | | | | |
|---|---|---|---|---|---|
| 8 | 2.058561E+00 | −7.467356E−01 | 1.099134E−01 | −8.575535E−02 | 3.053327E−02 |
| 9 | 1.312318E+00 | −5.321459E−01 | 1.243230E−01 | −1.507318E−02 | 6.532766E−04 |
| 10 | 2.954872E−02 | −2.913918E−05 | −4.114287E−04 | −1.198630E−03 | 3.026145E−04 |

TABLE 21

EXAMPLE 9 • ASPHERICAL SURFACE DATA

| SURFACE NUMBER | K | A3 | A4 | A5 | A6 |
|---|---|---|---|---|---|
| 1 | −1.436148E+01 | −1.390353E−01 | 2.163594E+00 | −3.602293E+00 | −3.841098E+00 |
| 2 | −5.699096E+01 | −8.139758E−02 | 8.664554E−01 | −9.997452E+00 | 6.785710E+01 |
| 3 | −9.271729E+01 | 1.932863E−01 | −2.220919E+00 | 4.356374E+00 | 5.573964E+00 |
| 4 | −2.916038E+01 | 4.542397E−02 | −5.615952E−01 | 9.720900E−01 | 1.899871E+00 |
| 5 | −1.000000E+02 | −7.078459E−02 | 6.290423E−01 | −4.438454E+00 | 1.374038E+01 |
| 6 | 3.133736E+01 | 3.725196E−02 | −4.960033E−01 | 2.081341E−01 | −5.252550E−01 |
| 7 | −1.000000E+02 | −1.773478E−01 | 2.472891E−01 | −2.646392E+00 | 5.120188E+00 |
| 8 | −1.132300E+01 | −3.914425E−01 | 9.852826E−02 | −4.577670E−01 | −1.368030E−01 |
| 9 | −2.857932E+01 | 2.066670E−01 | −1.732257E+00 | −3.024395E−01 | 3.146900E+00 |
| 10 | −3.308570E+00 | 1.078056E−01 | −1.740583E+00 | 1.881894E+00 | 6.536518E−01 |

| | A7 | A8 | A9 | A10 | A11 |
|---|---|---|---|---|---|
| 1 | 8.371420E+00 | 1.162818E+02 | −5.833364E+02 | 1.309271E+03 | −2.039604E+03 |
| 2 | −3.036302E+02 | 8.365187E+02 | −1.155493E+03 | −1.541161E+02 | 2.817973E+03 |
| 3 | −2.763068E+01 | 9.529336E+00 | 6.971251E+01 | −4.969847E+01 | −1.368524E+02 |
| 4 | −4.514009E+00 | 2.565167E+00 | −2.183608E+00 | 1.521117E+01 | −3.410177E+01 |
| 5 | −2.596491E+01 | 2.921953E+01 | −1.112273E+01 | −7.893429E+00 | 8.511505E+00 |
| 6 | 3.663841E+00 | −6.507464E+00 | 1.715749E+00 | 2.294562E+00 | 8.389032E+00 |
| 7 | −8.270335E−01 | −9.105358E+00 | 8.699961E+00 | −1.184386E+01 | 3.277908E+01 |
| 8 | 1.157392E+00 | −1.085419E+00 | 6.789719E−01 | −5.662428E−01 | 1.934824E−01 |
| 9 | −5.028466E+00 | −1.959576E+00 | −2.613146E−01 | 1.936979E+00 | −8.393665E−01 |
| 10 | −1.646690E+00 | 5.960906E−02 | 7.435696E−01 | −2.144187E−01 | −7.704575E−02 |

| | A12 | A13 | A14 | A15 | A16 |
|---|---|---|---|---|---|
| 1 | 3.227520E+03 | −4.825630E+03 | 4.669589E+03 | −2.222477E+03 | 3.312668E+02 |
| 2 | −2.363061E+03 | −3.619728E+03 | 8.451995E+03 | −6.208581E+03 | 1.636478E+03 |
| 3 | 1.862568E+02 | −4.577974E+01 | 7.171138E+01 | −1.652244E+02 | 8.007138E+01 |
| 4 | 3.533787E+01 | −8.264760E+00 | −1.337659E+01 | 5.954027E+01 | 9.118274E−01 |
| 5 | −4.001582E+01 | 9.329459E+01 | −5.376208E+01 | −2.541532E+01 | 2.342703E+01 |
| 6 | −1.398227E+01 | −4.522347E−01 | 6.321804E+00 | 2.239999E+00 | −2.913192E+00 |
| 7 | −2.312616E+01 | −3.104834E+01 | 5.179632E+01 | −2.400159E+01 | 3.217577E+00 |
| 8 | 1.637756E−01 | −6.626517E−02 | −7.202904E−02 | 4.424766E−02 | −6.229037E−03 |
| 9 | −2.008488E−01 | 2.084176E−01 | −2.990048E−02 | −7.227979E−02 | 1.693080E−03 |
| 10 | −1.524092E−02 | 4.341265E−02 | −9.679617E−03 | −1.654567E−03 | 5.452380E−04 |

TABLE 22

EXAMPLE 10 • ASPHERICAL SURFACE DATA

| SURFACE NUMBER | K | A3 | A4 | A5 | A6 |
|---|---|---|---|---|---|
| 1 | −1.436424E+01 | −1.453049E−01 | 2.696712E+00 | −1.173094E+01 | 5.881596E+01 |
| 2 | −5.862706E+01 | −6.368449E−02 | 3.487644E−01 | −2.752460E+00 | 9.814725E+00 |
| 3 | −9.565256E+01 | 1.537004E−01 | −2.019703E+00 | 3.913681E+00 | 4.447128E+00 |
| 4 | 6.802951E+00 | 3.524475E−02 | −6.011007E−01 | 1.090528E+00 | 2.007496E+00 |
| 5 | −1.000000E+02 | −7.220532E−02 | 6.411465E−01 | −3.975474E+00 | 9.992890E+00 |
| 6 | −2.121456E+00 | 1.643911E−02 | −3.635424E−01 | −6.697115E−02 | −7.880299E−01 |
| 7 | −9.955140E+01 | −1.186380E−01 | −3.624967E−03 | −2.160240E−01 | 5.220344E+00 |
| 8 | −1.116475E+01 | −5.216901E−01 | 9.619701E−02 | −1.333915E−01 | 3.619798E−01 |
| 9 | −3.442229E+01 | −1.008795E−01 | −1.349945E+00 | −3.214075E−03 | 3.224381E+00 |
| 10 | −3.350706E+00 | 3.768165E−02 | −1.472780E+00 | 1.595263E+00 | 9.833755E−01 |

| | A7 | A8 | A9 | A10 | A11 |
|---|---|---|---|---|---|
| 1 | −2.694325E+02 | 8.034752E+02 | −1.203561E+03 | −5.823002E+01 | 2.845130E+03 |
| 2 | −3.132930E+01 | 8.063253E+01 | −2.958221E+01 | −6.429228E+02 | 2.321770E+03 |
| 3 | −2.277567E+01 | 1.230075E+01 | 4.168035E+01 | −3.283222E+01 | −5.800843E+01 |
| 4 | −5.054468E+00 | −3.043355E+00 | 3.293073E+01 | −6.923816E+01 | 7.632446E+01 |
| 5 | −1.351219E+01 | 7.407089E+00 | 3.453274E+00 | 1.572060E+01 | −6.037336E+01 |

TABLE 22-continued

EXAMPLE 10 • ASPHERICAL SURFACE DATA

| | | | | | |
|---|---|---|---|---|---|
| 6 | 4.926581E+00 | −5.461118E+00 | −3.821032E+00 | 2.722520E+00 | 1.697318E+01 |
| 7 | −2.714552E+00 | −5.713878E+00 | −1.573289E−01 | 1.107374E+01 | 3.657656E+00 |
| 8 | −9.313970E−01 | 9.514933E−01 | −3.089322E−03 | −3.952526E−01 | −4.745963E−02 |
| 9 | −2.099298E+00 | −7.622673E−01 | 8.201454E−01 | −1.139213E−01 | 2.624357E−01 |
| 10 | −2.354066E+00 | 9.588273E−01 | 2.156012E−01 | −1.504308E−01 | 9.937997E−03 |

| | A12 | A13 | A14 | A15 | A16 |
|---|---|---|---|---|---|
| 1 | −2.238472E+03 | −4.600722E+03 | 1.000565E+04 | −7.162798E+03 | 1.819016E+03 |
| 2 | −3.969057E+03 | 3.877632E+03 | −2.288775E+03 | 8.659516E+02 | −1.965573E+02 |
| 3 | −3.597961E+00 | 1.988993E+02 | −1.705706E+02 | −5.713859E+00 | 3.415119E+01 |
| 4 | −5.719001E+01 | 4.499996E+01 | −1.865879E+01 | −1.759335E+01 | 1.396800E+01 |
| 5 | 2.505290E+01 | 8.526076E+01 | −8.856840E+01 | 3.685518E+00 | 1.540239E+01 |
| 6 | −9.783970E+00 | −2.683117E+01 | 2.913355E+01 | −3.310012E+00 | −3.345215E+00 |
| 7 | −1.302345E+01 | −1.607939E+01 | 3.235545E+01 | −1.479291E+01 | 1.528057E+00 |
| 8 | 2.156599E−01 | −5.014497E−03 | −6.491661E−02 | 1.557138E−01 | 1.125423E−03 |
| 9 | −2.724135E−01 | 1.566223E−02 | 6.913282E−02 | −2.864559E−02 | 3.540012E−03 |
| 10 | −6.229863E−02 | 5.217071E−02 | −1.044471E−02 | −1.385369E−03 | 4.857493E−04 |

TABLE 23

EXAMPLE 11 • ASPHERICAL SURFACE DATA

| SURFACE NUMBER | K | A3 | A4 | A5 | A6 |
|---|---|---|---|---|---|
| 1 | −1.463885E+01 | −1.571795E−01 | 2.229746E+00 | −2.367106E+00 | −2.047251E+01 |
| 2 | −1.000000E+02 | −7.850574E−02 | 3.190489E−01 | −1.267273E−01 | −1.295154E+01 |
| 3 | −9.292256E+01 | 1.816737E−01 | −1.947707E+00 | 3.331859E+00 | 7.867763E+00 |
| 4 | −1.000000E+02 | 4.308325E−02 | −5.042551E−01 | 9.355293E−01 | 1.678187E+00 |
| 5 | −1.000000E+02 | −8.265094E−02 | 6.037482E−01 | −3.833091E+00 | 9.562601E+00 |
| 6 | 1.140381E+01 | 2.392398E−03 | −3.487196E−01 | 1.759578E−01 | −1.332396E+00 |
| 7 | −2.454887E+01 | −1.602442E−01 | 2.938048E−01 | −2.128200E+00 | 1.922885E−01 |
| 8 | −1.008568E+01 | −4.494693E−01 | 7.692473E−02 | −1.034737E−01 | 6.904038E−02 |
| 9 | −1.591019E+01 | −9.865774E−02 | −1.261542E+00 | 1.430241E−01 | 2.135406E+00 |
| 10 | −4.286904E+00 | 7.317080E−02 | −1.470577E+00 | 1.190541E+00 | 1.783061E+00 |

| | A7 | A8 | A9 | A10 | A11 |
|---|---|---|---|---|---|
| 1 | 1.048437E+02 | −2.192118E+02 | 2.025451E+02 | −6.942787E+01 | 8.389134E+01 |
| 2 | 6.801582E+01 | −1.519093E+02 | 1.516062E+02 | −7.293380E+01 | 1.841524E+02 |
| 3 | −3.701930E+01 | 5.134192E+01 | −2.747003E+01 | 3.093389E+01 | −5.849588E+01 |
| 4 | −5.122620E+00 | 3.836224E+00 | 7.695644E+00 | −2.168611E+01 | 1.403785E+01 |
| 5 | −9.901735E+00 | −1.066193E+01 | 5.614411E+01 | −8.471261E+01 | 6.188279E+01 |
| 6 | 4.730914E+00 | −3.348577E+00 | −1.054603E+01 | 1.964807E+01 | −3.175571E−01 |
| 7 | 1.498302E+01 | −3.464697E+00 | 2.350946E+01 | 7.694620E+00 | −1.665224E+00 |
| 8 | −3.022171E−01 | 4.677113E−01 | −4.029204E−02 | −2.982957E−01 | 1.030203E−01 |
| 9 | −6.472551E−01 | −1.337207E+00 | 4.113290E−01 | 5.809389E−01 | −1.709200E−01 |
| 10 | −3.202818E+00 | 1.694272E+00 | −2.540488E−01 | −1.035656E−02 | 5.728781E−03 |

| | A12 | A13 | A14 | A15 | A16 |
|---|---|---|---|---|---|
| 1 | −3.991605E+01 | −2.542067E+02 | −8.712927E+00 | 6.407738E+02 | −4.374259E+02 |
| 2 | −4.959179E+02 | 6.569947E+02 | −6.516114E+02 | 5.319677E+02 | −2.126815E+02 |
| 3 | −1.889948E+01 | 8.749518E+01 | 3.770174E+01 | −1.322544E+02 | 5.697091E+01 |
| 4 | 1.979020E+01 | −4.147564E+01 | 4.165118E+01 | −3.467111E+01 | 1.376523E+01 |
| 5 | −5.186951E+01 | 8.278482E+01 | −5.127923E+01 | −1.765214E+01 | 1.910882E+01 |
| 6 | −2.626537E+01 | 3.351179E+01 | −3.370855E+01 | 2.708468E+01 | −9.256046E+00 |
| 7 | −3.530232E+01 | 4.795516E+01 | −3.590393E+01 | 1.955421E+01 | −5.262806E+00 |
| 8 | 1.145880E−01 | −5.028235E−02 | −2.984062E−02 | 1.868935E−02 | −2.246168E−03 |
| 9 | −2.161681E−01 | 1.279318E−01 | −1.256136E−02 | −5.410106E−03 | 1.054335E−03 |
| 10 | −3.740086E−02 | 1.746853E−02 | 4.839641E−03 | −4.186958E−03 | 6.562776E−04 |

TABLE 24

EXAMPLE 12 • ASPHERICAL SURFACE DATA

| SURFACE NUMBER | K | A3 | A4 | A5 | A6 |
|---|---|---|---|---|---|
| 1 | −1.477062E+01 | −1.649693E−01 | 2.308941E+00 | −2.748530E+00 | −1.827123E+01 |
| 2 | 1.000000E+02 | −1.027575E−01 | 4.876298E−01 | −5.393148E−01 | −1.154791E+01 |
| 3 | −9.298390E+01 | 1.341758E−01 | −1.769417E+00 | 3.547172E+00 | 3.919232E+00 |

TABLE 24-continued

EXAMPLE 12 • ASPHERICAL SURFACE DATA

| | | | | | |
|---|---|---|---|---|---|
| 4 | −9.056654E+01 | 1.085215E−02 | −2.909028E−01 | 6.786900E−01 | 5.485272E−01 |
| 5 | −1.000000E+02 | −9.153486E−02 | 6.884405E−01 | −3.806616E+00 | 9.620570E+00 |
| 6 | −2.059157E+01 | −3.832060E−02 | −3.232582E−02 | −1.409893E+00 | 5.960130E+00 |
| 7 | −3.071214E+01 | −1.589255E−01 | 4.079780E−01 | −3.137454E+00 | 5.561195E+00 |
| 8 | −1.115832E+01 | −5.430561E−01 | 1.664114E−01 | 1.083051E−01 | −4.140871E−01 |
| 9 | −9.359003E+00 | −3.419356E−01 | −9.951604E−01 | 2.437005E−01 | 1.706766E+00 |
| 10 | −3.928518E+00 | 8.494350E−03 | −1.468381E+00 | 1.747415E+00 | 1.798645E−01 |

| | A7 | A8 | A9 | A10 | A11 |
|---|---|---|---|---|---|
| 1 | 8.981809E+01 | −1.529078E+02 | 3.566399E+01 | 1.488723E+02 | 3.846606E+01 |
| 2 | 5.958228E+01 | −1.200216E+02 | 8.112183E+01 | 5.290707E+01 | −9.412747E+01 |
| 3 | −2.128926E+01 | 1.538921E+01 | 3.693521E+01 | −7.584246E+01 | 7.190476E+01 |
| 4 | −2.540507E+00 | 9.943509E+00 | −1.840351E+01 | 5.642586E+00 | 9.228114E+00 |
| 5 | −1.783673E+01 | 3.059755E+01 | −3.777835E+01 | 1.259497E+01 | 7.051507E+01 |
| 6 | −2.126442E+01 | 5.272953E+01 | −6.031045E+01 | −2.222917E+01 | 1.184250E+02 |
| 7 | −1.595098E+00 | −3.795642E+00 | −9.013408E+00 | 1.866781E+01 | 6.079469E+00 |
| 8 | −4.146393E−02 | 6.956094E−01 | −3.203762E−01 | −3.182083E−01 | 1.770240E−01 |
| 9 | 3.246712E−01 | −3.825800E+00 | 4.567384E+00 | −3.662177E+00 | 2.563702E+00 |
| 10 | −9.693141E−01 | −6.052564E−02 | 4.469324E−01 | −1.101005E−02 | −1.191688E−01 |

| | A12 | A13 | A14 | A15 | A16 |
|---|---|---|---|---|---|
| 1 | −3.871134E+02 | 4.176656E+02 | −6.692732E+02 | 1.011140E+03 | −5.317720E+02 |
| 2 | 1.057280E+02 | −2.412053E+02 | 1.801828E+02 | 9.268369E+01 | −1.099693E+02 |
| 3 | −9.979174E+01 | 1.104388E+02 | −9.558598E+00 | −6.221776E+01 | 2.785871E+01 |
| 4 | 2.179554E+01 | −4.258061E+01 | 6.726425E+00 | 1.295094E+01 | −3.692581E+00 |
| 5 | −2.148982E+02 | 3.233754E+02 | −2.465023E+02 | 7.324457E+01 | 3.880077E−01 |
| 6 | −3.128466E+01 | −1.816737E+02 | 2.349377E+02 | −1.120974E+02 | 1.835586E+01 |
| 7 | −1.704410E+01 | −1.941642E+01 | 3.716485E+01 | −1.606917E+01 | 1.448720E+00 |
| 8 | 1.267760E−01 | −1.794121E−02 | −9.873933E−02 | 5.168788E−02 | −7.180941E−03 |
| 9 | −1.328371E+00 | 3.950436E−01 | −4.143013E−02 | −6.513651E−03 | 1.474540E−03 |
| 10 | −1.062670E−02 | 4.266029E−02 | −1.280811E−02 | 3.185609E−04 | 2.226824E−04 |

TABLE 25

VALUES ABOUT CONDITIONAL FORMULAS

| | FORMULA NUMBER | EXAMPLE 1 | EXAMPLE 2 | EXAMPLE 3 | EXAMPLE 4 | EXAMPLE 5 | EXAMPLE 6 |
|---|---|---|---|---|---|---|---|
| vd2 | (1) | 23.63 | 23.63 | 23.63 | 23.63 | 23.63 | 23.63 |
| f2/f4 | (2) | 1.24 | 1.24 | 2.16 | 2.14 | 1.79 | 1.51 |
| Nd3 | (3) | 1.533914 | 1.533914 | 1.533914 | 1.533914 | 1.533914 | 1.533914 |
| Nd5 | (3) | 1.533914 | 1.533914 | 1.533914 | 1.533914 | 1.533914 | 1.533914 |
| vd3 | (4) | 55.89 | 55.89 | 55.89 | 55.89 | 55.89 | 55.89 |
| vd5 | (4) | 55.89 | 55.89 | 55.89 | 55.89 | 55.89 | 55.89 |
| vd4 | (5) | 55.89 | 55.89 | 55.89 | 55.89 | 55.89 | 38.81 |
| Fno | | 2.79 | 2.79 | 2.77 | 2.77 | 2.78 | 2.79 |
| f | | 3.72 | 3.72 | 3.74 | 3.73 | 3.73 | 3.79 |

| | FORMULA NUMBER | EXAMPLE 7 | EXAMPLE 8 | EXAMPLE 9 | EXAMPLE 10 | EXAMPLE 11 | EXAMPLE 12 |
|---|---|---|---|---|---|---|---|
| vd2 | (1) | 23.63 | 23.63 | 23.63 | 23.63 | 23.63 | 23.63 |
| f2/f4 | (2) | 2.51 | 2.66 | 2.11 | 1.78 | 1.77 | 1.72 |
| Nd3 | (3) | 1.533914 | 1.533914 | 1.533914 | 1.533914 | 1.533914 | 1.533914 |
| Nd5 | (3) | 1.533914 | 1.533914 | 1.533914 | 1.533914 | 1.533914 | 1.533914 |
| vd3 | (4) | 55.89 | 55.89 | 55.89 | 55.89 | 55.89 | 55.89 |
| vd5 | (4) | 55.89 | 55.89 | 55.89 | 55.89 | 55.89 | 55.89 |
| vd4 | (5) | 23.63 | 23.63 | 55.89 | 55.89 | 55.89 | 55.89 |
| Fno | | 2.76 | 2.77 | 2.78 | 2.78 | 2.79 | 2.80 |
| f | | 3.71 | 3.71 | 3.73 | 3.73 | 3.72 | 3.72 |

What is claimed is:

1. An imaging lens substantially consisting of five lenses of:

a first lens having a convex surface facing an object side in the vicinity of an optical axis and positive refractive power in the vicinity of the optical axis, and at least one of the surfaces of which is aspherical;

a second lens having a concave surface facing the object side in the vicinity of the optical axis and negative refractive power in the vicinity of the optical axis, and at least one of the surfaces of which is aspherical;

a third lens having a meniscus shape with its convex surface facing the object side in the vicinity of the optical axis and positive refractive power in the vicinity of the optical axis, and at least one of the surfaces of which is aspherical;

a fourth lens having negative refractive power in the vicinity of the optical axis, and at least one of the surfaces of which is aspherical; and a fifth lens having a meniscus shape with its convex surface facing the object side in the vicinity of the optical axis and positive refractive power in the vicinity of the optical axis, and at least one of the surfaces of which is aspherical, which are in this order from the object side, wherein the following conditional formulas are satisfied:

$$1 < f2/f4 < 3 \quad (2); \text{ and}$$

$$Nd3 < 1.6 \text{ and } Nd5 < 1.6 \quad (3), \text{ where}$$

f2: a focal length of the second lens,
f4: a focal length of the fourth lens,
Nd3: a refractive index of the third lens, and
Nd5: a refractive index of the fifth lens.

2. The imaging lens, as defined in claim 1, wherein the following conditional formula is further satisfied:

$$vd4 < 35 \quad (5), \text{ where}$$

vd4: an Abbe number of the fourth lens for d-line.

3. The imaging lens, as defined in claim 1, wherein the following conditional formula is further satisfied:

$$vd2 < 35 \quad (1), \text{ where}$$

vd2: an Abbe number of the second lens for d-line.

4. The imaging lens, as defined in claim 1, where the following conditional formulas are further satisfied:

$$50 < vd3 \text{ and } 50 < vd5 \quad (4), \text{ where}$$

vd3: an Abbe number of the third lens for d-line, and
vd5: an Abbe number of the fifth lens for d-line.

5. The imaging lens, as defined in claim 1, wherein an aperture stop is arranged on the object side of the first lens.

6. The imaging lens, as defined in claim 1, wherein the following conditional formula is further satisfied:

$$1.1 < f2/f4 < 2.8 \quad (2\text{-}1).$$

7. The imaging lens, as defined in claim 1, wherein the following conditional formulas are further satisfied:

$$Nd3 < 1.58 \text{ and } Nd5 < 1.58 \quad (3\text{-}1).$$

8. The imaging lens, as defined in claim 1, wherein the following conditional formula is further satisfied:

$$vd4 < 30 \quad (5\text{-}1), \text{ where}$$

vd4: an Abbe number of the fourth lens for d-line.

9. The imaging lens, as defined in claim 1, wherein the following conditional formula is further satisfied:

$$vd2 < 30 \quad (1\text{-}1), \text{ where}$$

vd2: an Abbe number of the second lens for d-line.

10. The imaging lens, as defined in claim 1, wherein the following conditional formulas are further satisfied:

$$53 < vd3 \text{ and } 53 < vd5 \quad (4\text{-}1), \text{ where}$$

vd3: an Abbe number of the third lens for d-line, and
vd5: an Abbe number of the fifth lens for d-line.

11. An imaging apparatus comprising:
the imaging lens, as defined in claim 1.

12. An imaging lens substantially consisting of five lenses of:
a first lens having a convex surface facing an object side in the vicinity of an optical axis and positive refractive power in the vicinity of the optical axis, and at least one of the surfaces of which is aspherical;

a second lens having a concave surface facing the object side in the vicinity of the optical axis and negative refractive power in the vicinity of the optical axis, and at least one of the surfaces of which is aspherical;

a third lens having a meniscus shape with its convex surface facing the object side in the vicinity of the optical axis and positive refractive power in the vicinity of the optical axis, and at least one of the surfaces of which is aspherical;

a fourth lens having negative refractive power in the vicinity of the optical axis, and at least one of the surfaces of which is aspherical; and a fifth lens having a convex surface facing the object side in the vicinity of the optical axis and positive refractive power in the vicinity of the optical axis, and at least one of the surfaces of which is aspherical, which are in this order from the object side, wherein the following conditional formulas are satisfied:

$$1 < f2/f4 < 3 \quad (2);$$

$$Nd3 < 1.6 \text{ and } Nd5 < 1.6 \quad (3); \text{ and}$$

$$vd4 < 35 \quad (5), \text{ where}$$

f2: a focal length of the second lens,
f4: a focal length of the fourth lens,
Nd3: a refractive index of the third lens,
Nd5: a refractive index of the fifth lens, and
vd4: an Abbe number of the fourth lens for d-line.

13. The imaging lens, as defined in claim 12, wherein the following conditional formula is further satisfied:

$$vd2 < 35 \quad (1), \text{ where}$$

vd2: an Abbe number of the second lens for d-line.

14. The imaging lens, as defined in claim 12, where the following conditional formulas are further satisfied:

$$50 < vd3 \text{ and } 50 < vd5 \quad (4), \text{ where}$$

vd3: an Abbe number of the third lens for d-line, and
vd5: an Abbe number of the fifth lens for d-line.

15. The imaging lens, as defined in claim 12, wherein an aperture stop is arranged on the object side of the first lens.

16. The imaging lens, as defined in claim 12, wherein the following conditional formula is further satisfied:

$$1.1 < f2/f4 < 2.8 \quad (2\text{-}1).$$

17. The imaging lens, as defined in claim 12, wherein the following conditional formulas are further satisfied:

$$Nd3 < 1.58 \text{ and } Nd5 < 1.58 \quad (3\text{-}1).$$

18. The imaging lens, as defined in claim 12, wherein the following conditional formula is further satisfied:

$$vd4 < 30 \quad (5\text{-}1), \text{ where}$$

vd4: an Abbe number of the fourth lens for d-line.

19. The imaging lens, as defined in claim 12, wherein the following conditional formula is further satisfied:

$$vd2 < 30 \quad (1\text{-}1), \text{ where}$$

vd2: an Abbe number of the second lens for d-line.

20. The imaging lens, as defined in claim 12, wherein the following conditional formulas are further satisfied:

$$53 < vd3 \text{ and } 53 < vd5 \quad (4\text{-}1), \text{ where}$$

vd3: an Abbe number of the third lens for d-line, and
vd5: an Abbe number of the fifth lens for d-line.

* * * * *